(12) United States Patent
Hasegawa et al.

(10) Patent No.: US 12,477,075 B2
(45) Date of Patent: Nov. 18, 2025

(54) COMMUNICATION TERMINAL, COMMUNICATION SYSTEM, DISPLAY METHOD, AND NON-TRANSITORY RECORDING MEDIUM

(71) Applicants: Takashi Hasegawa, Kanagawa (JP); Takeshi Horiuchi, Tokyo (JP); Takeshi Homma, Hyogo (JP); Hiroshi Hinohara, Kanagawa (JP)

(72) Inventors: Takashi Hasegawa, Kanagawa (JP); Takeshi Horiuchi, Tokyo (JP); Takeshi Homma, Hyogo (JP); Hiroshi Hinohara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/604,539

(22) Filed: Mar. 14, 2024

(65) Prior Publication Data

US 2024/0323310 A1 Sep. 26, 2024

(30) Foreign Application Priority Data

Mar. 22, 2023 (JP) ................................ 2023-045347
Jan. 11, 2024 (JP) ................................ 2024-002819

(51) Int. Cl.
*H04N 5/262* (2006.01)
*G06T 3/12* (2024.01)
*G06T 3/60* (2024.01)
*H04N 23/661* (2023.01)
*H04N 23/698* (2023.01)

(52) U.S. Cl.
CPC ............. *H04N 5/2628* (2013.01); *G06T 3/12* (2024.01); *G06T 3/60* (2013.01); *H04N 23/661* (2023.01); *H04N 23/698* (2023.01)

(58) Field of Classification Search
CPC ........... G06T 3/12; G06T 3/60; H04N 23/698; H04N 5/2628
See application file for complete search history.

(56) References Cited

U.S. PATENT DOCUMENTS

| | | | |
|---|---|---|---|
| 9,787,895 B2 * | 10/2017 | Rekimoto | G06T 3/60 |
| 11,128,814 B2 * | 9/2021 | Yamaku | H04N 23/6812 |
| 2016/0284048 A1 * | 9/2016 | Rekimoto | G06F 3/14 |
| 2020/0177824 A1 * | 6/2020 | Yamaku | G06T 7/20 |

FOREIGN PATENT DOCUMENTS

JP 2003-244728 A 8/2003

* cited by examiner

*Primary Examiner* — Boubacar Abdou Tchoussou
(74) *Attorney, Agent, or Firm* — XSENSUS LLP

(57) ABSTRACT

A communication terminal includes circuitry that: stores first position information of an image capturing apparatus in a memory, the first position information indicating a position of the image capturing apparatus when installed in a first time period; receives a wide-view image captured by the image capturing apparatus in a second time period and second position information of the image capturing apparatus via a network, the second position information indicating a position of the image capturing apparatus when installed in the second time period; corrects the wide-view image captured in the second time period, based on a difference between the first position information and the second position information; and causes a display to display the corrected wide-view image.

14 Claims, 32 Drawing Sheets

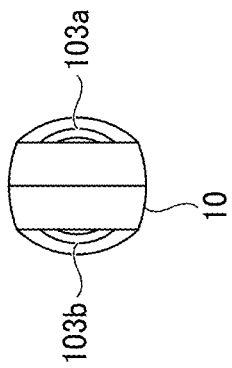
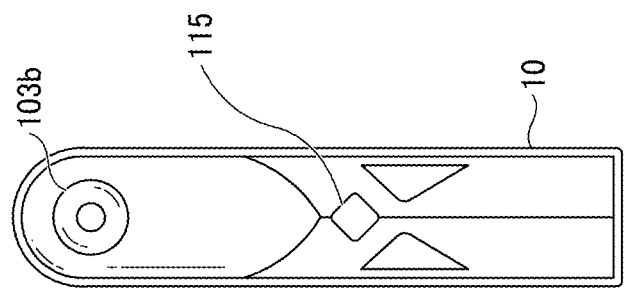
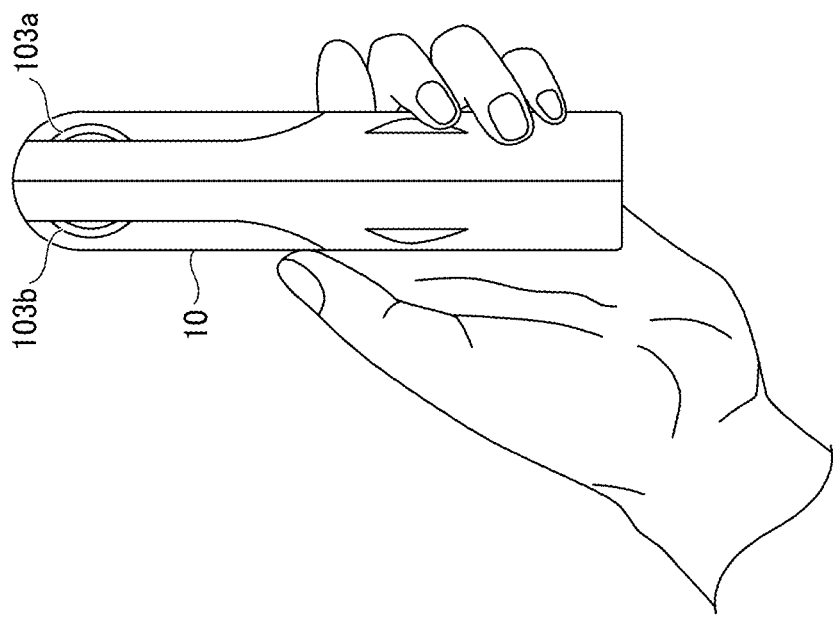

FIG. 8A
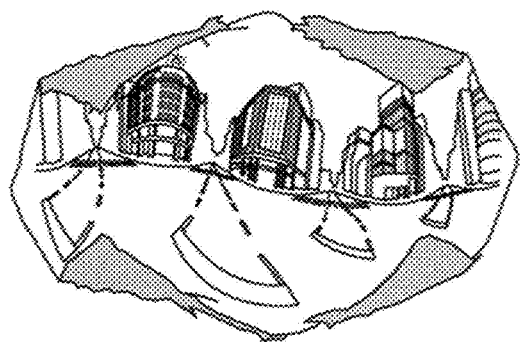
EQUIRECTANGULAR
PROJECTION IMAGE EC
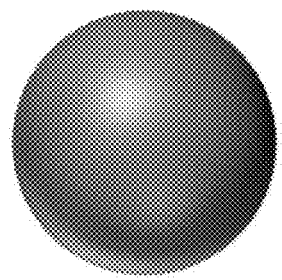
FIG. 8B
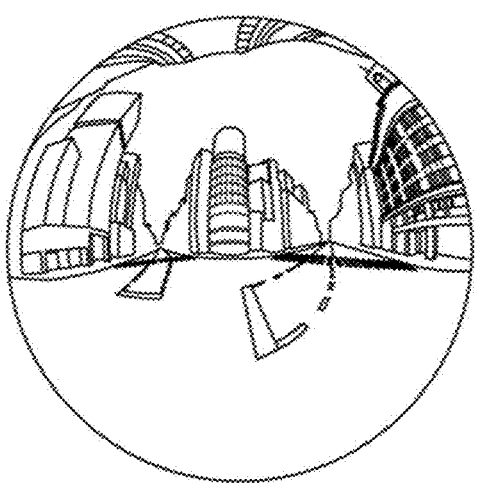
SPHERICAL IMAGE CE

VIRTUAL CAMERA IC
SPHERE CS
PREDETERMINED-AREA IMAGE Q (PREDETERMINED AREA T)

FIG. 14A

| DATA ID | DATA NAME | IMAGING DATE AND TIME INFORMATION | IMAGING OPERATOR INFORMATION | IMAGE CAPTURING APPARATUS INFORMATION | IMAGING OPERATOR'S POINT-OF-VIEW INFORMATION | | | IMAGING-TIME VIRTUAL ROOM ID | STORAGE LOCATION INFORMATION OF DATA |
|---|---|---|---|---|---|---|---|---|---|
| | | | | | RADIUS VECTOR | POLAR ANGLE | AZIMUTH ANGLE | | |
| 111 | BUILDING X UNDER CONSTRUCTION | 2021/10/12 9:00 | User111 | T111 | 10 | 20 | 30 | AAA | http://… |
| 222 | GROUP PHOTO-GRAPH AT EVENT Y | 2021/10/12 10:00 | User222 | T222 | 10 | 30 | 40 | BBB | http://… |
| 333 | SURGERY Z | 2021/10/15 11:00 | User333 | T333 | 20 | 30 | 60 | CCC | http://… |
| 444 | … | … | … | … | … | … | … | … | … |
| 555 | … | … | … | … | … | … | … | … | … |

FIG. 14B

| DATA ID | DATA NAME | IMAGING DATE AND TIME INFORMATION | IMAGING OPERATOR INFORMATION | IMAGE CAPTURING APPARATUS INFORMATION | IMAGING OPERATOR'S POINT-OF-VIEW INFORMATION | | | IMAGING-TIME VIRTUAL ROOM ID | STORAGE LOCATION INFORMATION OF DATA |
|---|---|---|---|---|---|---|---|---|---|
| | | | | | RADIUS VECTOR | POLAR ANGLE | AZIMUTH ANGLE | | |
| 111 | BUILDING X (1) | 2021/10/12 9:00 | User111 | T111 | 10 | 20 | 30 | AAA | http://… |
| 222 | BUILDING X (2) | 2021/10/12 10:00 | User222 | T222 | 20 | 30 | 40 | AAA | http://… |
| 333 | SURGERY Z | 2021/10/15 11:00 | User333 | T333 | 20 | 30 | 60 | BBB | http://… |
| 444 | … | … | … | … | … | … | … | … | … |
| 555 | … | … | … | … | … | … | … | … | … |

FIG. 15

VIRTUAL ROOM INFORMATION

| ITEM NAME | DEFINITION | EXAMPLE OF VALUE |
|---|---|---|
| VIRTUAL ROOM ID | IDENTIFICATION INFORMATION FOR IDENTIFYING VIRTUAL ROOM | AAA |
| VIRTUAL ROOM NAME | NAME FOR USER TO IDENTIFY VIRTUAL ROOM | CONSTRUCTION SITE A |
| DEVICE INFORMATION | IDENTIFICATION INFORMATION OF DEVICE ASSOCIATED WITH VIRTUAL ROOM | T111 |
| USER IN VIRTUAL ROOM | USER WHO IS CURRENTLY IN VIRTUAL ROOM AND AUTHORIZED TO VIEW WIDE-VIEW IMAGE | User111 (IP ADDRESS OF COMMUNICATION TERMINAL) User222 (IP ADDRESS OF COMMUNICATION TERMINAL) User333 (IP ADDRESS OF COMMUNICATION TERMINAL) |
| STORAGE | INFORMATION ON STORAGE ASSOCIATED WITH VIRTUAL ROOM | ADDRESS INFORMATION OF STORAGE X INFORMATION ON FOLDER IN STORAGE X |

FIG. 25

| ID | STORAGE DATE AND TIME | POINT-OF-VIEW INFORMATION (pan, tilt, fov) | POSITION INFORMATION (pitch, roll, yaw) | LOCATION INFORMATION (LATITUDE, LONGITUDE, ALTITUDE) |
|---|---|---|---|---|
| 001 | 2023-01-01T14:00:00+09:00 | -0.0016916167761774, -0.034132431088919, 1.134464013796631 | 0.110145144, 1.8332775, 2.736665 | 35.45090913, 139.4374477, 43.04223937 |
| 002 | 2023-01-01T14:10:00+09:00 | -0.0016916167761774, -0.034132431088919, 1.134464013796631 | 0.224494324, 2.065623, 2.8113546 | 35.45090913, 139.4374477, 43.04223937 |
| 003 | 2023-01-02T14:00:00+09:00 | -0.0016916167761774, -0.034132431088919, 1.134464013796631 | 222093837, 1.9628837, 2.8670003 | 35.45090913, 139.4345377, 43.04224012 |

FIG. 26A

| NAME | DESCRIPTION |
|---|---|
| pan (PAN ANGLE) | Horizontal angle (in radians)<br>Value in the following range, or the remainder obtained by dividing the value by $2\pi$ when the value exceeds the range.<br>$-2\pi <= pan <= 2\pi$ |
| tilt (TILT ANGLE) | Vertical angle (in radians)<br>Value in the following range, or upper limit/lower limit when the value exceeds the range.<br>$-\pi/2 <= tilt <= \pi/2$ |
| fov (VIEWING ANGLE) | Viewing angle (in radians)<br>Value in the following range, or upper limit/lower limit when the value exceeds the range.<br>$(65/ZoomMaxRange)/180*\pi <= fov <= 100/180*\pi$ |

FIG. 26B

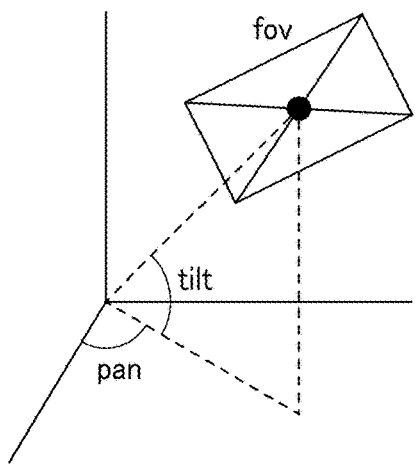

FIG. 26C

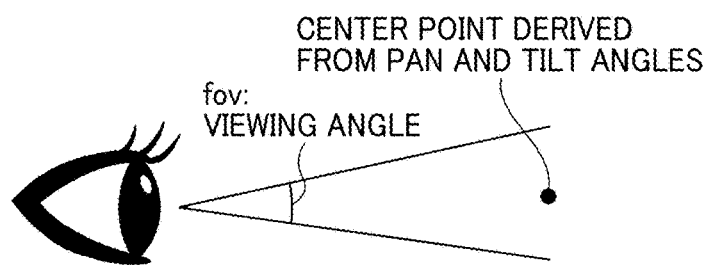

COMMUNICATION TERMINAL, COMMUNICATION SYSTEM, DISPLAY METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2023-045347, filed on Mar. 22, 2023, and 2024-002819, filed on Jan. 11, 2024, in the Japan Patent Office, the entire disclosure of each is hereby incorporated by reference herein.

BACKGROUND

Technical Field

The present disclosure relates to a communication terminal, a communication system, a display method, and a non-transitory recording medium.

Related Art

A known communication system transmits at least images and audio from one site to one or more other sites in real time to allow remote users to perform remote communication using the images and audio. Such a communication system allows the users to check their situations with the images without visiting each other and provide voice instructions to a person in charge at the site to handle the situations.

Also known is a technique for creating video of a subject from a location where an image capturing apparatus such as a camera is difficult to place. For example, it is possible to create virtual video of a subject viewed from a location where an image capturing apparatus is difficult to place, based on a plurality of image capturing apparatuses.

In the technique of the related art, a change in the position of an image capturing apparatus causes a change in an image captured by the image capturing apparatus. In use scenes such as building construction site scenes, images of structures such as a building are periodically captured and recorded as images to check differences between the images. In such a use scene, it is difficult for a user to grasp a difference between images captured by an image capturing apparatus installed in the same location but in different positions. The user desires to secure an image capturing apparatus in position as much as possible. However, the image capturing apparatus may be difficult to secure for security or safety reasons. Accordingly, the person in charge at the construction site installs the image capturing apparatus at regular intervals, and the image capturing apparatus is difficult to install in exactly the same position as that in the previous image capturing sessions.

SUMMARY

According to an embodiment, a communication terminal includes circuitry that stores first position information of an image capturing apparatus in a memory; the first position information indicating a position of the image capturing apparatus when installed in a first time period; receives a wide-view image captured by the image capturing apparatus in a second time period and second position information of the image capturing apparatus via a network, the second position information indicating a position of the image capturing apparatus when installed in the second time period; corrects the wide-view image captured in the second time period, based on a difference between the first position information and the second position information; and causes a display to display the corrected wide-view image.

According to an embodiment, a communication system includes an image capturing apparatus; a memory that stores first position information of the image capturing apparatus, the first position information indicating a position of the image capturing apparatus when installed in a first time period; and circuitry. The circuitry: receives a wide-view image captured by the image capturing apparatus in a second time period and second position information of the image capturing apparatus via a network, the second position information indicating a position of the image capturing apparatus when installed in the second time period; corrects the wide-view image captured in the second time period, based on a difference between the first position information and the second position information; and causes a display to display the corrected wide-view image.

According to an embodiment, a display method includes: storing first position information of an image capturing apparatus in a memory; the first position information indicating a position of the image capturing apparatus when installed in a first time period; correcting a wide-view image captured by the image capturing apparatus when installed in a second time period, based on a difference between the first position information and second position information of the image capturing apparatus, the second position information indicating a position of the image capturing apparatus when installed in the second time period; and displaying the corrected wide-view image on a display. According to an embodiment, a non-transitory recording medium stores a plurality of instructions which, when executed by one or more processors, causes the processors to perform a display method including: storing first position information of an image capturing apparatus in a memory, the first position information indicating a position of the image capturing apparatus when installed in a first time period; correcting a wide-view image captured by the image capturing apparatus when installed in a second time period, based on a difference between the first position information and second position information of the image capturing apparatus, the second position information indicating a position of the image capturing apparatus when installed in the second time period; and displaying the corrected wide-view image on a display.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 5A, 5B, and 5C are a left side view, a front view, and a plan view of the image capturing apparatus according to an embodiment, respectively;

FIG. 8A is a conceptual diagram illustrating an example of how the image in equirectangular projection is mapped to a surface of a sphere, according to the embodiment;

FIG. 8B is a view illustrating a spherical image, according to the embodiment;

FIGS. 14A and 14B are tables illustrating image management information stored in an image management information storage unit according to the embodiment;

FIG. 15 is a table illustrating virtual room information stored in a virtual room information storage unit according to the embodiment;

FIG. 25 is a table illustrating an example of imaging status information stored in an imaging status information storage unit of the communication terminal;

FIGS. 26A, 26B, and 26C are illustrations of point-of-view information according to an embodiment;

Figure 1:
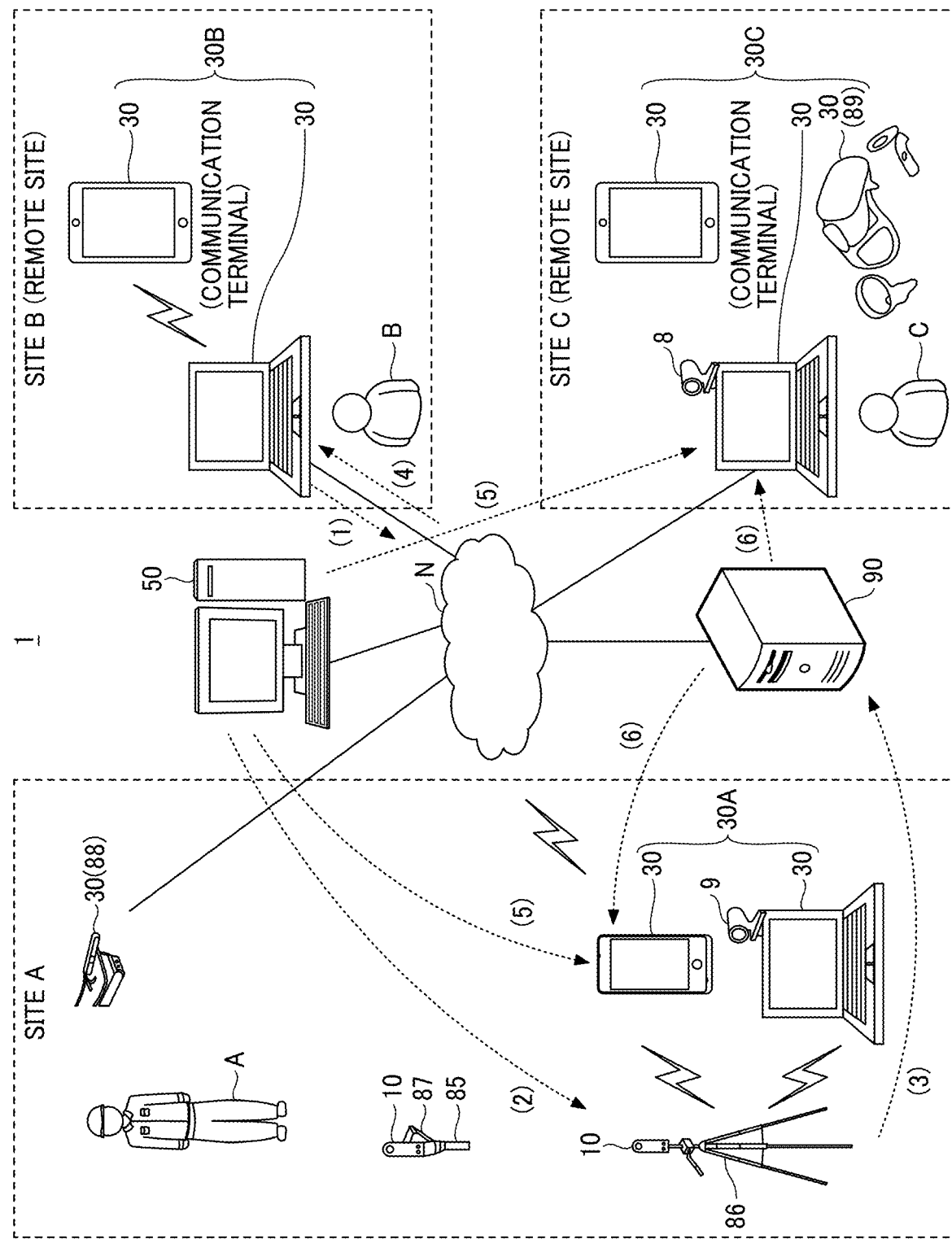
FIG. 1 is a diagram illustrating an example of remote communication using a wide-view image.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An information processing system and a display method performed by the information processing system according to an embodiment of the present disclosure will be described hereinafter.

Example of Remote Communication

FIG. 1 is a diagram illustrating an example of remote communication using a wide-view image. In FIG. 1, communication takes place across three sites, namely, a site A, a site B, and a site C, via an information processing system 50. Three sites are merely an example, and communication may be performed across two sites or four or more sites. Remote communication refers to communication that takes place between individuals who are located in physically distant locations by using information technology (IT) tools through images and audio.

In one example, the site A is a construction site. The sites B and C are any sites across which a wide-view image can be communicated. In one example, the sites B and C are offices. An image capturing apparatus 10 is placed at the site A. In one example, the image capturing apparatus 10 can capture a wide-angle image called a spherical image and an image with a wide angle of view ranging from, for example, 180 degrees to 360 degrees in the horizontal direction. Such an image with a wide angle of view is hereinafter simply referred to as a "wide-view image". Communication terminals 30A to 30C for viewing a wide-view image are placed at the sites A to C, respectively. Any communication terminal or communication terminals among the communication terminals 30A to 30C are hereinafter referred to as a "communication terminal 30" or "communication terminals 30".

In the construction site, workers are involved in various constructions at various places. In one embodiment, a user A at the site A, a user B at the site B, and a user C at the site C monitor any construction and/or work of interest by changing a point of view as appropriate for a wide-view image that is a captured image of the entire construction site. The term "point of view" refers to the center position or range of the entire wide-view image. The center position or range of the entire wide-view image is to be displayed on a display or other means of the communication terminals 30A and 30C.

In one example, the image capturing apparatus 10 is attached to a tripod 86. In another example, the image capturing apparatus 10 is attached to an arm 85 through a gimbal 87. A relay device is installed at the construction site. In FIG. 1, the communication terminal 30A also functions as the relay device. The communication terminal 30A receives a wide-view image from the image capturing apparatus 10 via a wire or wirelessly and transmits the received wide-view image to the information processing system 50. The communication terminal 30A may also function as a terminal for viewing the wide-view image. In one example, a camera 9 connected to (or incorporated in) the communication terminal 30A captures an image having a normal angle of view (or a spherical image), and the captured image can be transmitted to the information processing system 50. In another example, smart glasses 88 worn by the user A capture an image having a normal angle of view (or a spherical image), and the captured image is transmitted to the information processing system 50. The user A may be a worker. The smart glasses 88 are an information terminal having a display on which information acquired via the Internet is displayed with a field of view maintained. The smart glasses 88 may be placed at any site.

The communication terminal 30B, such as a personal computer (PC) or a smartphone, is placed at the site B. The communication terminal 30B is any device for communicating with the information processing system 50 via a communication network N. Other examples of the communication terminal 30B include display devices such as a tablet terminal, a personal digital assistant (PDA), an electronic whiteboard, and a projector. A camera may be incorporated in or connected to the communication terminal 30B.

The communication terminal 30C, such as a PC, a smartphone, or virtual reality (VR) goggles 89, is placed at the site C. In FIG. 1, a camera 8 is incorporated in or connected to the communication terminal 30C. The VR goggles 89 are an information terminal for displaying a computer-based artificial world or a spherical image in accordance with the direction of movement of the neck and/or the body of the user wearing the VR goggles 89. The camera 8 may be for a wide angle of view or a normal angle of view. The communication terminal 30C is any device for communicating with the information processing system 50 via the communication network N. Other examples of the communication terminal 30C include display devices such as a tablet terminal, a PDA, an electronic whiteboard, and a projector. The VR goggles 89 may be placed in any site.

In this embodiment, the image capturing apparatus 10 and the communication terminals 30 are managed using a communication group called a virtual room. The image capturing apparatus 10 is associated with the virtual room. Each of the communication terminals 30 (the users who operate the communication terminals 30) enters the virtual room and receives a wide-view image transmitted from the image capturing apparatus 10. As a result, the user can view the wide-view image. In one embodiment, the smart glasses 88 or the VR goggles 89 are also associated with the virtual room. The cameras 8 and 9 enter the virtual room together the communication terminals 30.

The users A to C at the sites A to C are each allowed to change the point of view for the wide-view image, as desired. Thus, the users A to C may view the wide-view image in real time from different points of view. It may be difficult for the users A to C to mutually understand each other. In this embodiment, accordingly, for example, the point of view of the communication terminal 30 at the site A is shared by the communication terminals 30 at the other sites B and C. An overview of the sharing of the point of view will be described. In the following description, in one example, the point of view of the user B at the site B is shared by the users A and C at the sites A and C.

(1) The communication terminals 30A to 30C share a wide-view image (an example of a first wide-view image) captured by the image capturing apparatus 10. In response to the user B making a request to capture a wide-view image while viewing the wide-view image from any point of view on the communication terminal 30B, the communication terminal 30B (an example of a first communication terminal) transmits point-of-view information and the request to the information processing system 50.

(2) In response to the request, the information processing system 50 designates point-of-view information and transmits an image capturing request to the image capturing apparatus 10 to capture an image (either a still image or a moving image).

(3) The image capturing apparatus 10 captures a wide-view image (an example of a second wide-view image) in response to the image capturing request, and stores the wide-view image and the point-of-view information in a uniform resource locator (URL) transmitted from the information processing system 50. The URL is an example of storage destination information. In FIG. 1, the image capturing apparatus 10 stores the wide-view image and the point-of-view information in a storage 90. In one embodiment, the wide-view image stored in the storage 90 is downloaded and displayed by any of the communication terminals 30.

(4) The information processing system 50 transmits the URL to the communication terminal 30B.

(5) The information processing system 50 further transmits the URL to the communication terminals 30A and 30C (examples of a second communication terminal), which are in the virtual room as that associated with the image capturing apparatus 10 and the communication terminal 30B, automatically or in response to a request from the user B.

(6) The communication terminals 30A and 30C connect to the URL and receive the point-of-view information and the wide-view image. Each of the communication terminals 30A and 30C sets and displays the point of view identified by the point-of-view information such that the point of view matches the center of an image field. In one embodiment, the point of view is not made to completely match the center of the image field. In another embodiment, the point of view may be set and displayed so as to be included in a range near the center of the image field.

The same applies when the point of view of the user A at the site A is shared by the users B and C at the sites B and C and when the point of view of the user C at the site C is shared by the users A and B at the sites A and B.

As described above, in a communication system 1 according to this embodiment, even after a wide-view image is distributed, point-of-view information is shared at the respective sites. This facilitates understanding among users at the respective sites.

In (3), the image capturing apparatus 10 may transmit the wide-view image itself to the information processing system 50. In (4), the information processing system 50 may transmit the wide-view image to the communication terminals 30A to 30C.

In the example illustrated in FIG. 1, the image capturing apparatus 10 is placed at a construction site. This embodiment is also applicable to VR education, event distribution, remote customer services, telemedicine services, and other situations. In VR education, the image capturing apparatus 10 is placed at a site such as a study room or a laboratory. Students can view a blackboard, an instrument, a sample, an experimental result, or the like from remote sites while changing the points of view as appropriate. In event distribution, the image capturing apparatus 10 is placed in a venue of an event to be held on-site. Event participants such as an audience can view the details in the venue online from remote sites while changing the points of view as appropriate. The details in the venue include images of event performers, event participants, and event presenters, images of objects involved in the event, such as products or exhibits, images of materials involved in the event, and images of the venue. The event may be held indoor or outdoor, and examples of the venue of the event include venues such as sports stadiums, concert halls, and theaters. In remote customer services, for example, in customer services for a travel agency, the image capturing apparatus 10 is placed at each of travel destination sites. A customer can plan their itinerary from a remote site while changing the point of view as appropriate. In telemedicine services, in one example, the image capturing apparatus 10 is placed in a medical setting such as an operating room. Medical people such as doctors, medical students, and persons related to medical instruments can view the performance of a doctor(s) and a nurse(s) during on-site medical treatment, the arrangement of medical instruments, the state of a patient, vitals, and the like from remote sites while changing the points of view as appropriate.

The site at which an image is captured is not limited to any of the sites described above. An image may be captured in any space that a user (or viewer) at a viewing site desires to remotely grasp. Examples of such a space include a school, a factory, a warehouse, a building site, a server room, and a store.

Terminology

The term "tenant" refers to an entity such as a company or an organization that has a contract with a service provider to receive an image distribution service. In this embodiment, the service provider is an information processing system. In one example, a user belongs to the tenant. In another example, a user may personally subscribe to the service. A user, an image capturing apparatus, a virtual room, and the like are registered in a tenant.

The term "site" refers to a location where activity takes place. In this embodiment, a conference room will be described as an example of a site. The conference room is a room to be used mainly for a conference. A conference is an event where people gather to discuss something and is also referred to as a meeting, a session, a gathering, an assembly, or the like.

The term "device" refers to an apparatus different from the communication terminal 30 for general purposes such as a PC or a smartphone. In one example, the device is an image capturing apparatus or an apparatus for viewing a wide-view image. In this embodiment, examples of the device include the image capturing apparatus 10, the smart glasses 88, and the VR goggles 89.

The term "point-of-view information" refers to parameter information that specifies which predetermined area in a wide-view image to be displayed on the display is to be displayed on the display. In this embodiment, in one example, the point-of-view information includes a radius vector, a polar angle, and an azimuth angle of the center of the wide-view image to be displayed on the display. In another example, the wide-view image may be specified by other parameter information such as the coordinates of diagonal vertices.

The term "wide-view image" refers to an image having a wide viewing angle and captured in a wide imaging range. The term "wide-view image" is used to include a 360-degree image that is a captured image of an entire 360-degree view. The 360-degree image is also referred to as a spherical image, an omnidirectional image, or an "all-around" image. The wide-view image means an image having a viewing angle in a wider range than a display range that can be displayed on the display at a time in a predetermined display method. The wide-view image has a display range corresponding to a field of view up to 360 degrees in the vertical direction and a field of view up to 360 degrees in the horizontal direction. In one example, the wide-view image is an image having a display range corresponding to a field of view of less than 360 degrees in the vertical and horizontal directions as long as the wide-view image has a viewing angle in a wider range than the display range that can be displayed on the display screen of the display at a time. Examples of the wide-view image include an image having a display range wider than a range that can be visually recognized at a time by a person looking at the range. Depending on the display method, an image that can be displayed on the display at a time is also the wide-view image as long as the image has a wide range of viewing angles in a predetermined display method. In this embodiment, a spherical image in equirectangular projection is used as an example of a wide-view image. Other examples of the wide-view image include an omnidirectional image, a hemispherical image, a three-dimensional (3D) panoramic image, a two-dimensional (2D) panoramic image, and a VR image. An image in equirectangular projection is also referred to as an equirectangular image.

The term "remote customer service" refers to a business where an operator or a staff member at a remote location provides customers (or users) with assistance regarding products and/or services by using a video conference through a tablet or a display.

An image having a normal angle of view is not a wide-view image. In this embodiment, such an image is referred to as a non-wide-view image, that is, a planar image.

The term "communication group" refers to a group of users who share a wide-view image, that is, a group of users to whom a wide-view image is to be distributed.

The communication group will be described with the term "virtual room" in the sense that in a typical space, the users in the same room can share a wide-view image. The term "virtual" means being implemented by information processing via a network.

Users at respective sites perform remote communication across remote locations. The remote communication is a meeting, which is an online meeting, accessible from remote locations, or sites. The meeting means a gathering of people for consultation, discussion, or the like. Examples of the meeting include, but are not limited to, serving a customer, a meeting, a conference, a gathering, an assembly, a study session, a class, a seminar, and a presentation. The remote communication is not necessarily bidirectional communication. Thus, the virtual room may be referred to as a virtual conference room.

Remote communication refers to communication that takes place between individuals who are located in physically distant locations by using IT tools through images and audio.

The term "image" refers to an image displayed on a display device or projected by a projector or the like.

Example Configuration of Communication System

Figure 2:
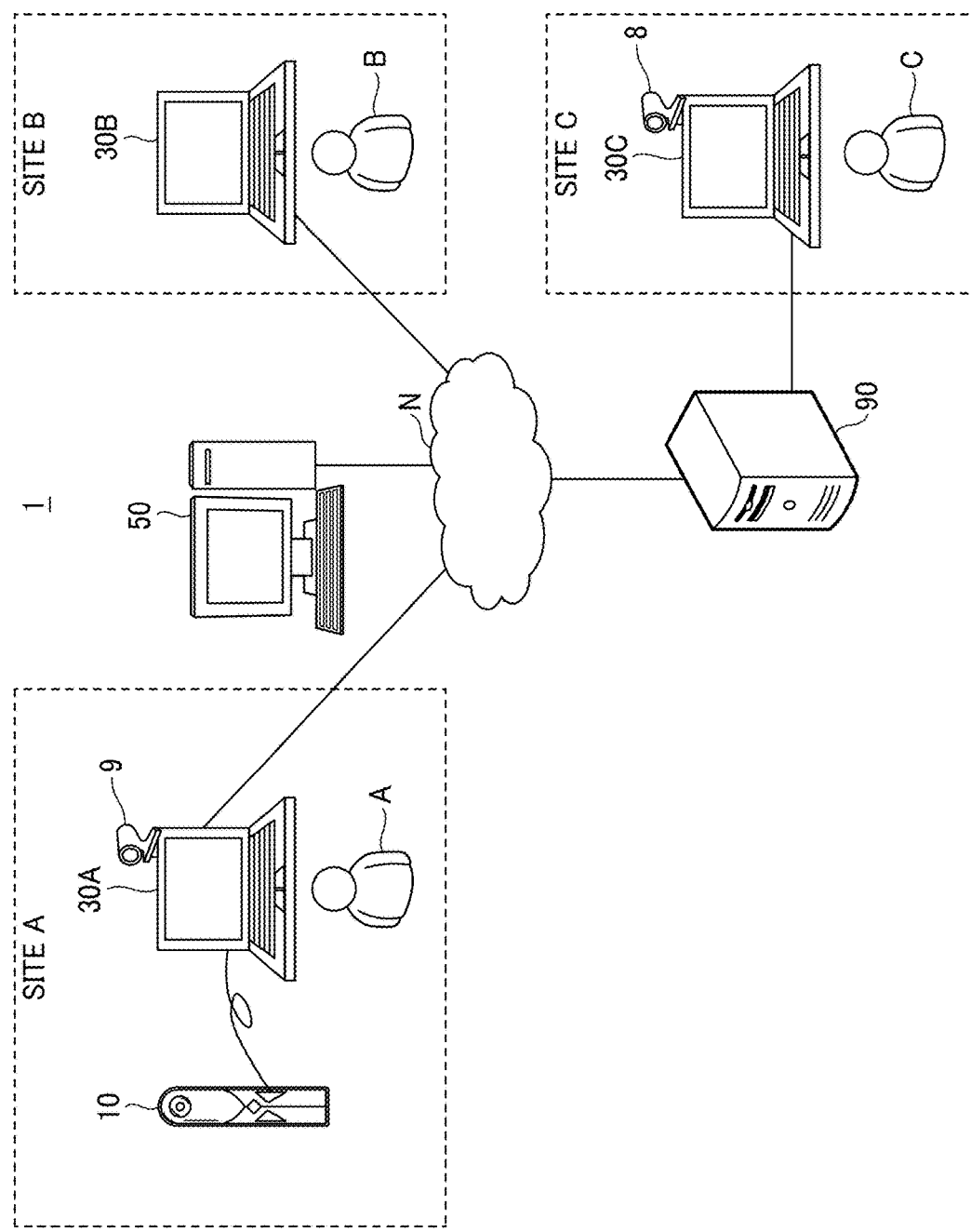
FIG. 2 is a diagram illustrating an example schematic configuration of a communication system.

FIG. 2 is a diagram illustrating an example schematic configuration of the communication system 1. The communication system 1 is a system for transmitting and receiving a wide-view image captured by the image capturing apparatus 10 or an image having a normal angle of view bidirectionally among a plurality of sites. In the communication system 1, an image distributed from one of the sites is displayed at the other sites and is viewable to users at the other sites. In one example, a spherical image captured by the image capturing apparatus 10 is distributed as the wide-view image. In the communication system 1, for example, a wide-view image captured at a predetermined site is remotely viewable at another site.

In the communication system 1, as illustrated in FIG. 2, the image capturing apparatus 10 and the communication terminal 30A placed at the site A, the information processing system 50, and the communication terminals 30B and 30C placed at a plurality of sites, namely, the sites B and C, respectively, are communicably connected to each other.

In a case where the image capturing apparatus 10 is directly connectable to the communication network N, the communication terminal 30A serving as a relay device (e.g., a router) is not used. In this case, the image capturing apparatus 10 is connected to the communication network N without intervening the communication terminal 30A. In a case where the communication terminal 30A is placed at the site A, the communication terminal 30A also functions as a relay device, and the user A can view a wide-view image in a manner similar to that of the communication terminals 30B and 30C. The image capturing apparatus 10 may additionally be placed at a site other than the site A, or a plurality of image capturing apparatuses 10 may be placed at the site A.

In one embodiment, each communication terminal 30 and the information processing system 50 communicate with each other via the communication network N. The communication network N includes the Internet, a mobile communication network, and a local area network (LAN), for example. The communication network N may include a wired communication network and a wireless communication network. The wireless communication network may be based on a wireless communication standard such as third generation (3G), fourth generation (4G), fifth generation (5G), Wireless Fidelity (Wi-Fi®), Worldwide Interoperability for Microwave Access (WiMAX), or Long Term Evolution (LTE).

The image capturing apparatus 10 is a special digital camera configured to capture an image of an object and/or surroundings such as scenery to obtain two hemispherical images, from which a spherical image is generated, as described below. The wide-view image obtained by the image capturing apparatus 10 may be a moving image or a still image, or may include both of a moving image and a still image. The image capturing apparatus 10 may record both a captured image and audio.

The communication terminal 30 is a computer such as a PC to be operated by a user at each site.

The communication terminal 30 displays an image captured at the site where the communication terminal 30 is placed, and a wide-view image (still image and/or moving image) and an image having a normal angle of view, which are distributed from other sites. For example, the communication terminal 30 acquires a wide-view image, which is captured by the image capturing apparatus 10, via the communication network N. The communication terminal 30 has installed therein software for executing image processing, such as Open Graphics Library for Embedded Systems (OpenGL ES), and can display an image based on point-of-view information that specifies a partial area in the wide-view image. OpenGL ES is an example of software for executing image processing. Any other software may be used. In one example, the communication terminal 30 does not have installed therein software for executing image processing, and executes image processing by using software received from the outside or receives a result of image processing executed by external software to display an image. That is, the communication terminal 30 can display a predetermined area, which is part of the wide-view image.

In one embodiment, the communication terminal 30 changes the point of view for the display range of the wide-view image, as desired, in response to the user's operation. The communication terminal 30 shifts the virtual point of view in response to a user operation input (such as key input, dragging, or scrolling) on a touch panel, a direction button, a mouse, a keyboard, a touch pad, or the like to change and display a visual field range (predetermined area) based on point-of-view information corresponding to a point of view obtained by shifting the virtual point of view. In one example, the communication terminal 30 is a communication terminal to be worn by the user, such as VR goggles. In response to a change in the movement of the user wearing the communication terminal 30, position information of the communication terminal 30 is changed. In response to detection of the change in the position information, the virtual point of view is shifted in accordance with the detected position information to change a visual field range (predetermined area), based on point-of-view information corresponding to the shifted point of view, and the changed visual field range (predetermined area) is displayed.

The communication terminal 30A acquires a wide-view image from the image capturing apparatus 10 via a wired cable such as a Universal Serial Bus (USB) cable and distributes the acquired wide-view image to the communication terminal 30 at another site via the information processing system 50. The connection between the image capturing apparatus 10 and the communication terminal 30A may be either a wired connection using a wired cable or a wireless connection using short-range wireless communication, for example. A plurality of communication terminals 30A may be placed at the site A.

In one example, the user A at the site A wears the smart glasses 88, and the smart glasses 88 are connected to the communication network N. In one embodiment, an image captured by the smart glasses 88 is transmitted to the information processing system 50 via the communication network N, and the information processing system 50 distributes the image to the communication terminal 30 at each site.

The communication terminal 30B is placed at the site B where the user B is located, and the communication terminal 30C is placed at the site C where the user C is located. A plurality of communication terminals 30B may be placed at the site B, and a plurality of communication terminals 30C may be placed at the site C. The users B and C may carry the communication terminals 30B and 30C, respectively.

Each of the communication terminals 30A to 30C at the sites A to C may be internally or externally provided with the camera 8 or 9. Each of the communication terminals 30A to 30C may distribute an image of the corresponding one of the sites A to C, which is captured by the camera 8 or 9 thereof, to the other sites. Any device may be placed at each of the sites A to C.

The arrangement of the terminals and apparatuses (i.e., the communication terminals 30 and the image capturing apparatus 10) and the users A to C illustrated in FIG. 2 is an example. Any other arrangement may be used. Examples of the communication terminal 30 are not limited to a PC, but include a tablet terminal, a smartphone, a wearable terminal, a projector, an interactive white board (IWB), and a telepresence robot. The IWB is an electronic whiteboard with mutual communication capability. The communication terminal 30 is any computer on which a web browser or an application dedicated to an image distribution service operates.

In one example, the image capturing apparatus 10 includes a display and displays an image distributed from another site on the display.

The information processing system 50 includes one or more information processing apparatuses. The information processing system 50 manages and controls communication among the image capturing apparatus 10 and the communication terminals 30 at the respective sites and manages a wide-view image to be transmitted and received. The information processing system 50 provides a platform on which a function of providing an image distribution service for distributing a wide-view image is available. The platform may be made available to a person, a company, or any other service provider that desires to provide an image distribution service, under contract. A service provider that provides an image distribution service to a user by using a platform is hereinafter referred to as a platform contractor to distinguish the service provider from a tenant who receives the image distribution service.

The information processing system 50 may publish an application programming interface (API) as a platform, and the platform contractor may use the API to provide various image distribution services. The platform contractor mainly develops software such as an application for calling the API or the screen to be displayed on the communication terminal 30. That is, the functions to be provided by the API, such as image distribution, do not have to be developed from scratch.

The information processing system 50 may be implemented by a single computer or a plurality of computers such that the components (functions or means) of the information processing system 50 are assigned to the plurality of computers as appropriate. All or some of the functions of the information processing system 50 may be implemented by a server computer residing in a cloud environment or a server computer residing in an on-premise environment.

The storage 90 is a storage device separate from the information processing system 50. In one embodiment, the storage 90 is an external storage. The external storage may be a cloud or on-premise storage. In another embodiment, the storage 90 is a storage included in the information processing system 50.

Example Hardware Configuration

Next, the hardware configurations of each apparatus or terminal included in the communication system 1 according to this embodiment will be described with reference to FIGS. 3 and 4. In the hardware configurations illustrated in FIGS. 3 and 4, certain hardware elements may be added or deleted as appropriate.

Hardware Configuration of Image Capturing Apparatus

First, the hardware configuration of the image capturing apparatus 10 will be described with reference to FIG. 3. FIG. 3 is a diagram illustrating an example hardware configuration of the image capturing apparatus 10. In the following description, the image capturing apparatus 10 is a spherical (omnidirectional) image capturing apparatus including two imaging elements. In some embodiments, the image capturing apparatus 10 includes any number of imaging elements, provided that the image capturing apparatus 10 includes at least two imaging elements. In one example, the image capturing apparatus 10 is not dedicated to omnidirectional image capturing, and an external omnidirectional image capturing unit is attached to a general-purpose digital camera or a smartphone to implement functions that are substantially the same as those of the image capturing apparatus 10.

Figure 3:
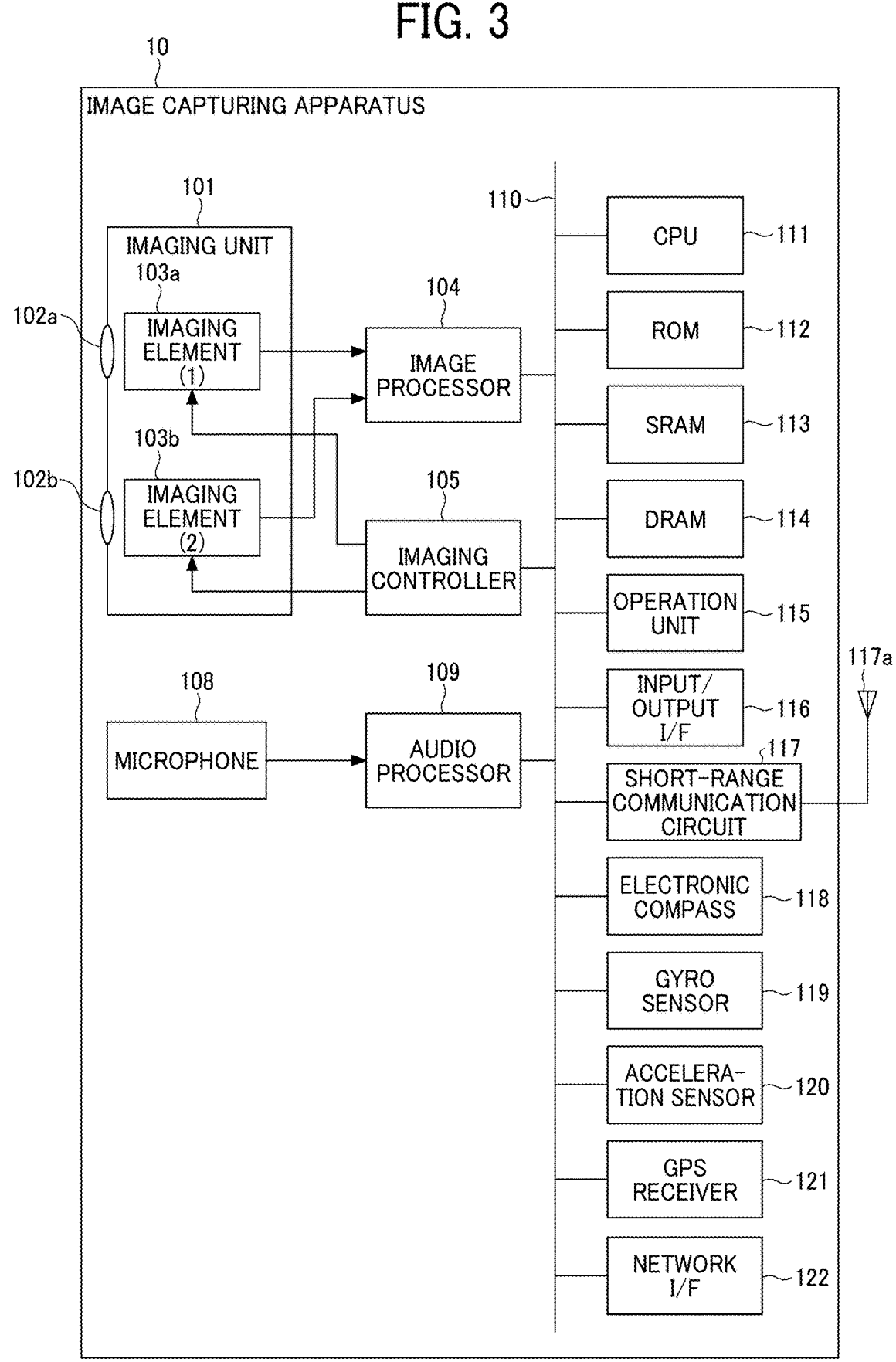
FIG. 3 is a diagram illustrating an example hardware configuration of an image capturing apparatus.

As illustrated in FIG. 3, the image capturing apparatus 10 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, an operation unit 115, an input/output interface (I/F) 116, a short-range communication circuit 117, an antenna 117a for the short-range communication circuit 117, an electronic compass 118, a gyro sensor 119, an acceleration sensor 120, a global positioning system (GPS) receiver 121, and a network I/F 122.

The imaging unit 101 includes two wide-angle lenses (so-called fish-eye lenses) 102a and 102b (collectively referred to as lens 102 unless distinguished), each having an angle of view of equal to or greater than 180 degrees so as to form a hemispherical image. The imaging unit 101 further includes two imaging elements 103a and 103b corresponding to the lenses 102a and 102b respectively. Each of the imaging elements 103a and 103b includes an image sensor such as a complementary metal oxide semiconductor (CMOS) sensor or a charge-coupled device (CCD) sensor, a timing generation circuit, and a group of registers. The image sensor converts an optical image formed by the lens 102a or 102b into an electric signal and outputs image data. The timing generation circuit generates horizontal or vertical synchronization signals, pixel clocks, and the like for the image sensor. In the group of registers, various commands, parameters, and the like for an operation of the imaging element 103a or 103b are set. As a non-limiting example, the imaging unit 101 includes two wide-angle lenses. The imaging unit 101 may include one wide-angle lens or three or more wide-angle lenses.

Each of the imaging elements 103a and 103b of the imaging unit 101 is connected to the image processor 104 via a parallel I/F bus. Further, each of the imaging elements 103a and 103b of the imaging unit 101 is connected to the imaging controller 105 via a serial I/F bus such as an inter-integrated circuit (I2C) bus. The image processor 104, the imaging controller 105, and the audio processor 109 are connected to the CPU 111 via a bus 110. The ROM 112, the SRAM 113, the DRAM 114, the operation unit 115, the input/output I/F 116, the short-range communication circuit 117, the electronic compass 118, the gyro sensor 119, the acceleration sensor 120, the GPS receiver 121, and the network I/F 122 are also connected to the bus 110.

The image processor 104 acquires respective items of image data output from the imaging elements 103a and 103b via the parallel I/F buses and performs predetermined processing on the items of image data. Thereafter, the image processor 104 combines the items of image data to generate data of an equirectangular projection image described below.

The imaging controller 105 usually functions as a master device while each of the imaging elements 103a and 103b usually functions as a slave device. The imaging controller 105 sets commands and the like in the group of registers of each of the imaging elements 103a and 103b via the I2C bus. The imaging controller 105 receives various commands from the CPU 111. The imaging controller 105 further acquires status data and the like of the group of registers of each of the imaging elements 103a and 103b via the I2C bus. The imaging controller 105 sends the obtained status data and the like to the CPU 111.

The imaging controller 105 instructs the imaging elements 103a and 103b to output the image data at the time when a shutter button of the operation unit 115 is pressed. In one example, the image capturing apparatus 10 displays a preview image or a moving image (movie) on a display. Examples of the display include a display of a smartphone or any other external terminal that performs short-range communication with the image capturing apparatus 10 through the short-range communication circuit 117. In the case of displaying a movie, image data are continuously output from the imaging elements 103a and 103b at a predetermined frame rate (expressed in frames per minute).

As described below, the imaging controller 105 operates in cooperation with the CPU 111 to synchronize the time when the imaging element 103a outputs image data and the time when the imaging element 103b outputs the image data. In this embodiment, the image capturing apparatus 10 does not include a display unit (or display). In some embodiments, the image capturing apparatus 10 may include a display unit. The microphone 108 converts sound to audio data (signal).

The audio processor 109 acquires the audio data output from the microphone 108 via an I/F bus and performs predetermined processing on the audio data.

The CPU 111 controls the overall operation of the image capturing apparatus 10 and performs predetermined processing.

The ROM 112 stores various programs for execution by the CPU 111. Each of the SRAM 113 and the DRAM 114 operates as a work memory to store programs to be executed by the CPU 111 and/or data being currently processed. More specifically, in one example, the DRAM 114 stores image data currently processed by the image processor 104 and/or data of the equirectangular projection image on which processing has been performed.

The operation unit 115 collectively refers to various operation buttons, a power switch, a shutter button, a touch panel having both the display and operation functions, and the like. The user operates the operation unit 115 to input various image capturing modes or image capturing conditions, for example.

The input/output I/F 116 collectively refers to an interface circuit such as a USB I/F that allows the image capturing apparatus 10 to communicate with an external medium such as a Secure Digital (SD) card or an external personal computer. The input/output I/F 116 may be either wired or wireless. The data of the equirectangular projection image, which is stored in the DRAM 114, is stored in the external medium via the input/output I/F 116 or transmitted to an external terminal (apparatus) via the input/output I/F 116, as desired.

The short-range communication circuit 117 communicates with the external terminal (apparatus) via the antenna 117a of the image capturing apparatus 10 by short-range wireless communication technology such as near field communication (NFC), Bluetooth®, or Wi-Fi®. In one embodiment, the short-range communication circuit 117 transmits the data of the equirectangular projection image to the external terminal (apparatus).

The electronic compass 118 calculates an orientation of the image capturing apparatus 10 from the Earth's magnetism and outputs orientation information. The orientation information is an example of related information (metadata) in compliance with exchangeable image file format (Exif). The orientation information is used for image processing such as image correction of a captured image. The related information also includes data of a date and time when the image was captured, and data of a data size of image data.

The gyro sensor 119 detects a change in the tilt (roll, pitch, and yaw angles) of the image capturing apparatus 10 with movement of the image capturing apparatus 10. The change in tilt is one example of related information (metadata) in compliance with Exif. This information is used for image processing such as image correction of a captured image. The acceleration sensor 120 detects acceleration in three axial directions. The image capturing apparatus 10 calculates the position of the image capturing apparatus 10 (e.g., the tilt of the image capturing apparatus 10 relative to the direction of gravity), based on the acceleration detected by the acceleration sensor 120. The gyro sensor 119 and the acceleration sensor 120 of the image capturing apparatus 10 improve the accuracy of image correction.

The GPS receiver 121 receives radio waves from three or more GPS satellites whose orbits are known, and detects location information (latitude, longitude, and altitude) of the image capturing apparatus 10, based on the arrival times of the radio waves from the GPS satellites.

The network I/F 122 is an interface for performing data communication using the communication network N, such as the Internet, via a router or the like.

Hardware Configuration of Communication Terminal

Figure 4:
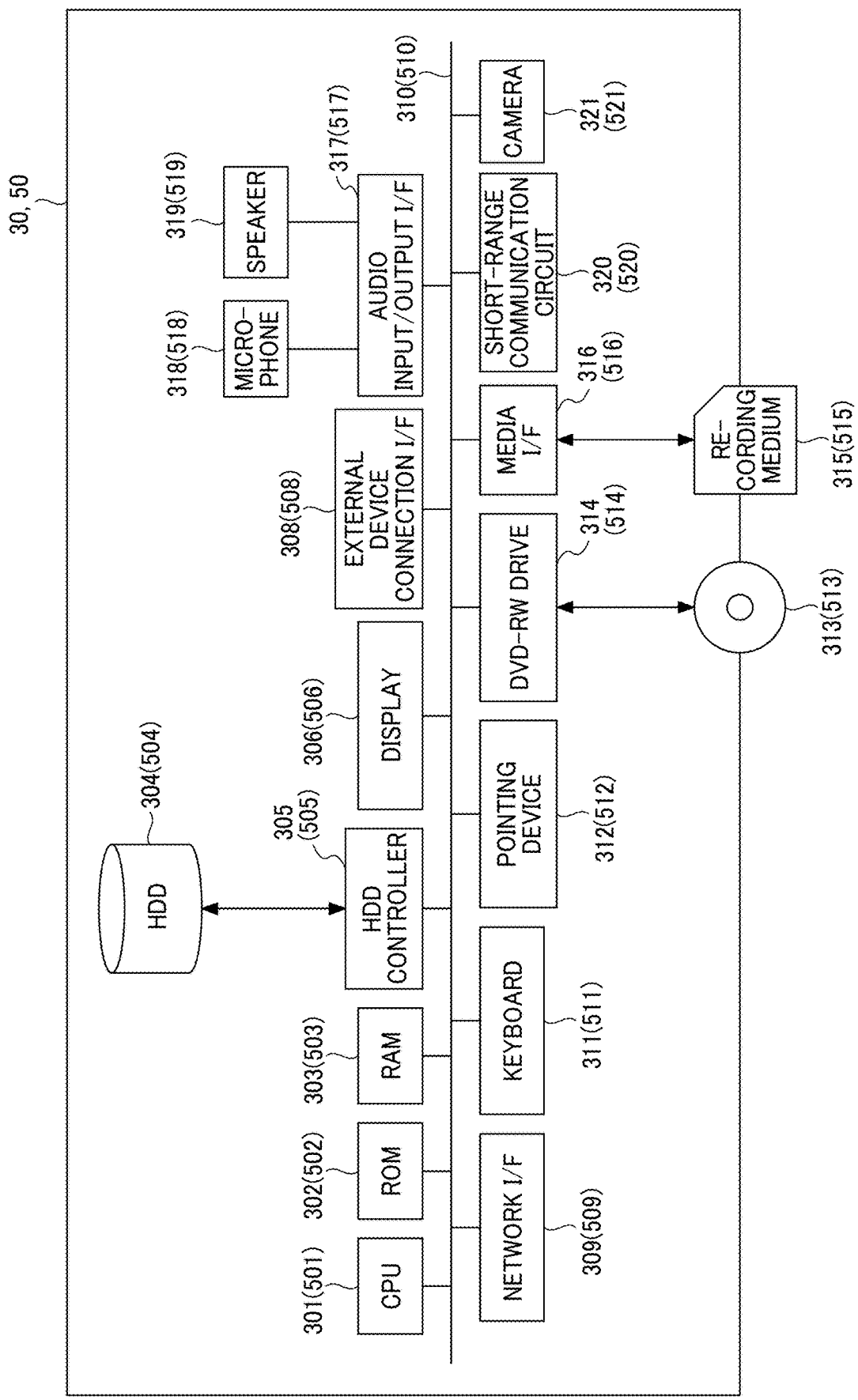
FIG. 4 is a diagram illustrating an example hardware configuration of a communication terminal and an information processing system.

FIG. 4 is a diagram illustrating an example hardware configuration of the communication terminal 30 and the information processing system 50. First, the communication terminal 30 will be described. Each hardware element of the communication terminal 30 is denoted by a reference numeral in 300 series. The communication terminal 30 is implemented by one or more computers. As illustrated in FIG. 4, the communication terminal 30 includes a CPU 301, a ROM 302, a RAM 303, a hard disk drive (HDD) 304, an HDD controller 305, a display 306, an external device connection I/F 308, a network I/F 309, a bus line 310, a keyboard 311, a pointing device 312, a digital versatile disc rewritable (DVD-RW) drive 314, a media I/F 316, an audio input/output I/F 317, a microphone 318, a speaker 319, a short-range communication circuit 320, and a camera 321.

The CPU 301 controls the overall operation of the communication terminal 30. The ROM 302 stores a program used for driving the CPU 301, such as an initial program loader (IPL). The RAM 303 is used as a work area for the CPU 301. The HDD 304 stores various types of data such as a program. The HDD controller 305 controls reading or writing of various types of data from or to the HDD 304 under control of the CPU 301. The display 306 displays various types of information such as a cursor, a menu, a window, characters, and an image. The display 306 is an example of a display unit. In one example, the display 306 is a touch panel display provided with an input means. The external device connection I/F 308 is an interface for connecting to various external devices. The external devices include, but are not limited to, a USB memory and a printer. The network I/F 309 is an interface for performing data communication using the communication network N. The bus line 310 is an address bus or a data bus for electrically connecting the hardware elements illustrated in FIG. 4, such as the CPU 301, to each other.

The keyboard 311 is an example of input means including a plurality of keys for inputting characters, numerical values, various instructions, and the like. The pointing device 312 is an example of input means used for selecting or executing various instructions, selecting a target for processing, or moving a cursor being displayed. The input means are not limited to the keyboard 311 and the pointing device 312 and may include a touch panel and a voice input device. The DVD-RW drive 314 controls reading or writing of various types of data from or to a DVD-RW 313, which is an example of a removable recording medium. A DVD-R, a Blu-ray Disc®, or any other recording medium may be used instead of the DVD-RW 313. The media I/F 316 controls reading or writing (storing) of data from or to a recording medium 315 such as a flash memory.

The microphone 318 is an example of built-in sound collecting means for receiving input sounds. The audio input/output I/F 317 is a circuit for controlling input and output of audio signals between the microphone 318 and the speaker 319 under control of the CPU 301. The short-range communication circuit 320 communicates with the external terminal (apparatus) by short-range wireless communication technology such as NFC, Bluetooth®, or Wi-Fi®. The camera 321 is an example of built-in image capturing means for capturing an image of an object to obtain image data. In one example, the microphone 318, the speaker 319, and the camera 321 are devices external to the communication terminal 30 in alternative to built-in devices.

Hardware Configuration of Information Processing System

As illustrated in FIG. 4, each hardware element of the information processing system 50 is denoted by a reference numeral in 500 series in parentheses. The information processing system 50 is implemented by one or more computers and has substantially the same configuration as that of the communication terminal 30 illustrated in FIG. 4, and thus the description of the hardware elements of the information processing system 50 will be omitted.

Each of the programs described above may be recorded as a file in a format installable or executable on a computer-readable recording medium for distribution. Examples of the recording medium include a compact disc recordable (CD-R), a digital versatile disc (DVD), a Blu-ray Disc®, an SD card, and a USB memory. The recording medium may be provided in the form of a program product to domestic or foreign users. For example, the communication terminal 30 executes a program according to an embodiment of the present disclosure to implement a display method according to an embodiment of the present disclosure.

Wide-View Image and Point-of-View Information

A method for generating a wide-view image (spherical image) will be described hereinafter with reference to FIGS. 5A to 12.

First, the external appearance of the image capturing apparatus 10 will be described with reference to FIGS. 5A to 5C. The image capturing apparatus 10 is a digital camera for capturing images from which a 360-degree spherical image is generated. FIG. 5A is a left side view of the image capturing apparatus 10. FIG. 5B is a front view of the image capturing apparatus 10. FIG. 5C is a plan view of the image capturing apparatus 10. The illustrated external view of the image capturing apparatus 10 is merely an example. The image capturing apparatus 10 may have any other external appearance.

As illustrated in FIG. 5A, the image capturing apparatus 10 has a size such that a person can hold the image capturing apparatus 10 with one hand. The illustrated shape of the image capturing apparatus 10 is an example. The image capturing apparatus 10 may have any other shape. As illustrated in FIGS. 5A, 5B, and 5C, the imaging element 103a and the imaging element 103b are disposed in an upper portion of the image capturing apparatus 10 such that the imaging element 103a is disposed on the front side and the imaging element 103b is disposed on the back side. The imaging elements (image sensors) 103a and 103b are used in combination with optical members (e.g., the lenses 102a and 102b described above), each being configured to capture a hemispherical image having an angle of view of equal to or greater than 180 degrees. As illustrated in FIG. 5B, the operation unit 115, such as a shutter button, is disposed on the back surface of the image capturing apparatus 10. As described above, the image capturing apparatus 10 may include one imaging element or three or more imaging elements.

Figure 6:
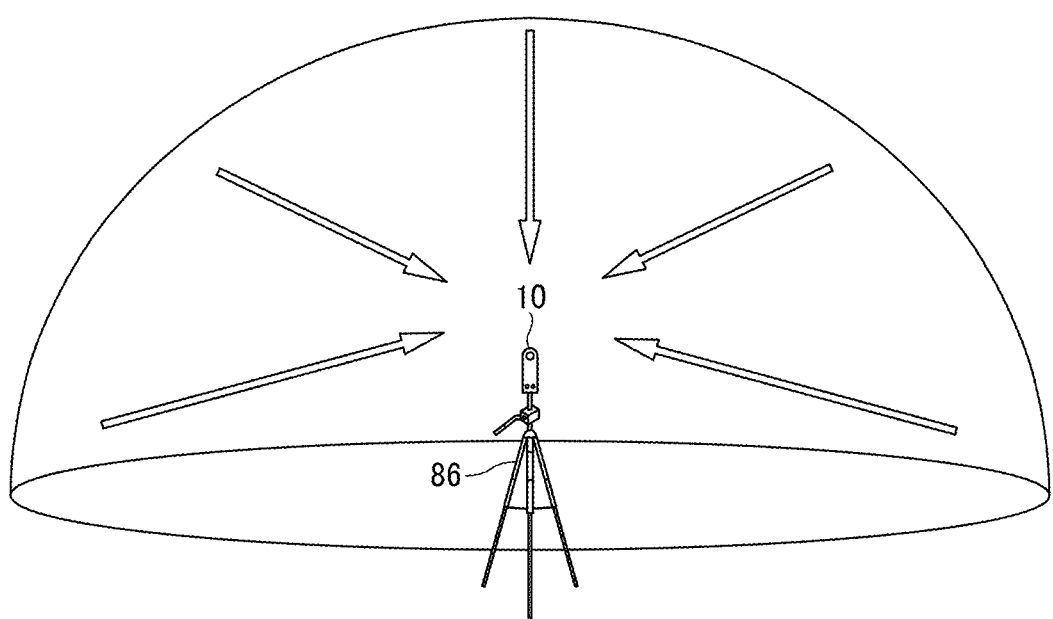
FIG. 6 is an illustration for explaining how a user uses the image capturing apparatus, according to the embodiment.

Next, a situation where the image capturing apparatus 10 is used will be described with reference to FIG. 6. FIG. 6 is an illustration for explaining how a user uses the image capturing apparatus 10. As illustrated in FIG. 6, for example, the image capturing apparatus 10 is used for capturing an image of objects surrounding the image capturing apparatus 10. Each of the imaging elements 103a and 103b illustrated in FIGS. 5A to 5C captures an image of the objects surrounding the image capturing apparatus 10. As a result, two hemispherical images are obtained.

Figure 7A:
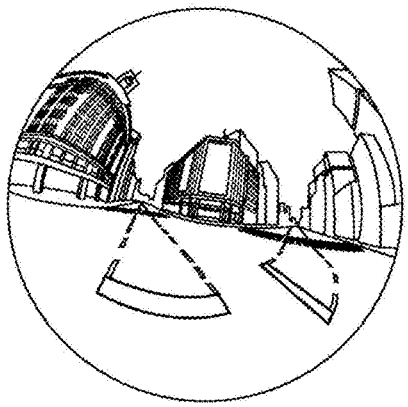
FIGS. 7A, 7B, and 7C are views illustrating a hemispherical image (front side) captured by the image capturing apparatus, a hemispherical image (back side) captured by the image capturing apparatus, and an image in equirectangular projection, respectively, according to the embodiment.
Figure 7B:
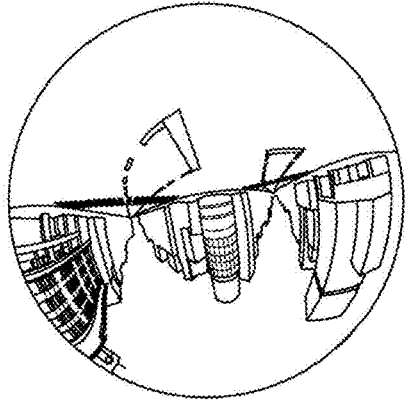
Figure 7C:
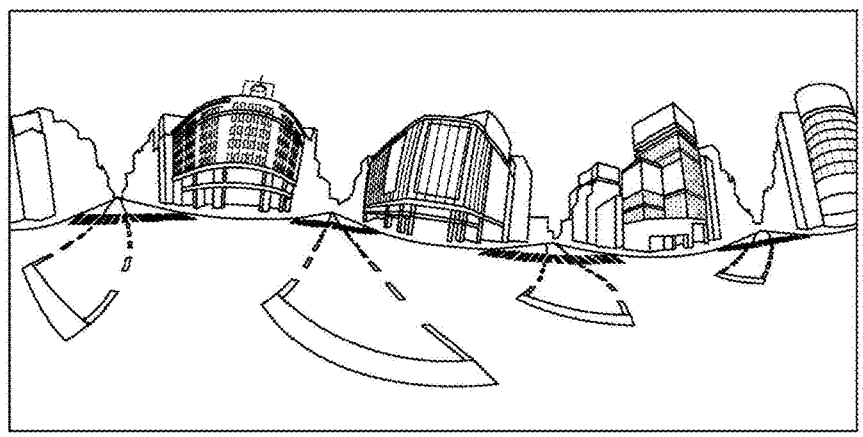

Next, an overview of a process for generating a spherical image from the images captured by the image capturing apparatus 10 will be described with reference to FIGS. 7A to 7C and FIGS. 8A and 8B. FIG. 7A illustrates a hemispherical image (front side) captured by the image capturing apparatus 10. FIG. 7B illustrates a hemispherical image (back side) captured by the image capturing apparatus 10. FIG. 7C illustrates an image in equirectangular projection (hereinafter referred to as an "equirectangular projection image" or an "equidistant cylindrical projection image"). FIG. 8A conceptually illustrates how the equirectangular projection image is mapped to a surface of a sphere. FIG. 8B illustrates a spherical image.

As illustrated in FIG. 7A, an image obtained by the imaging element 103*a* is a curved hemispherical image (front side) captured through the lens 102*a* described above. As illustrated in FIG. 7B, an image captured by the imaging element 103*b* is a curved hemispherical image (back side) captured through the lens 102*b* described above. The image capturing apparatus 10 combines the hemispherical image (front side) and the hemispherical image (back side), which are flipped by 180 degrees, to create an equirectangular projection image EC as illustrated in FIG. 7C.

The image capturing apparatus 10 uses software such as OpenGL ES to map the equirectangular projection image EC to a sphere so as to cover the surface of the sphere as illustrated in FIG. 8A. As a result, the image capturing apparatus 10 generates a spherical image (or spherical panoramic image) CE as illustrated in FIG. 8B. That is, the spherical image CE is represented as the equirectangular projection image EC, which corresponds to a surface facing the center of the sphere. OpenGL ES is a graphics library used for visualizing 2D data and 3D data. OpenGL ES is an example of software for executing image processing. Any other software may be used to create the spherical image CE. The spherical image CE may be either a still image or a moving image.

As described above, since the spherical image CE is an image mapped to a sphere so as to cover the surface of the sphere, part of the image may look distorted when viewed by a user, providing a strange feeling. Accordingly, the image capturing apparatus 10 displays an image of a predetermined area T, which is part of the spherical image CE, as a planar image having fewer curves to make the user feel comfortable. The predetermined area is, for example, a part of the spherical image CE that is viewable by the user. In this disclosure, the image of the predetermined area, which is viewable, may be referred to as a "predetermined-area image" or "viewable-area image" Q. That is, the term "predetermined-area image" and "viewable-area image" may be used interchangeably. The display of the predetermined-area image will be described with reference to FIGS. 9, 10A, and 10B.

Figure 9:
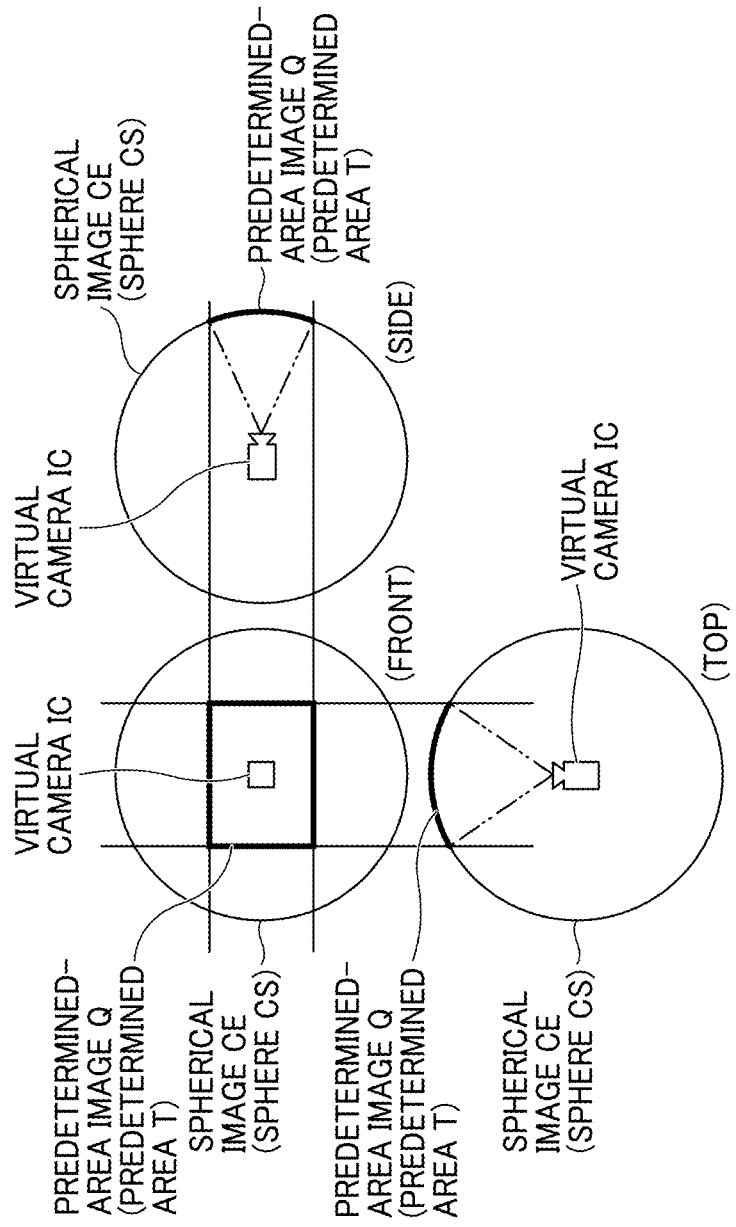
FIG. 9 is a view illustrating positions of a virtual camera and a predetermined area in a case where the spherical image is of a three-dimensional sphere according to the embodiment.
Figure 10A:
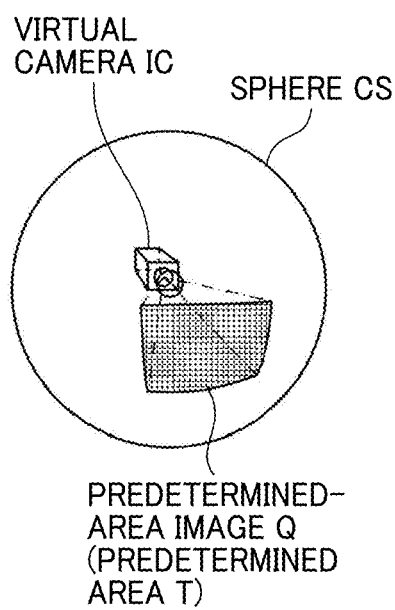
FIG. 10A is a perspective view of the virtual camera and the predetermined area illustrated in FIG. 9 according to an embodiment of the present disclosure.
Figure 10B:
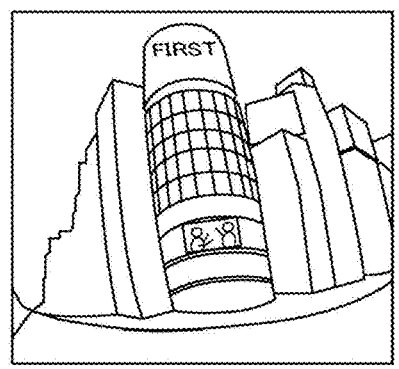
FIG. 10B is a view illustrating an image of the predetermined area displayed on a display according to the embodiment.

FIG. 9 illustrates the position of a virtual camera IC and the position of the predetermined area T in a case where the spherical image CE is of a three-dimensional sphere CS. The virtual camera IC corresponds to a position of a point of view (viewpoint) of a user who is viewing the spherical image CE represented as a surface area of the three-dimensional solid sphere CS. FIG. 10A is a perspective view of the virtual camera IC and the predetermined area T illustrated in FIG. 9, and FIG. 10B illustrates the predetermined-area image displayed on a display. In FIG. 10A, the spherical image CE illustrated in FIG. 9 is represented by the three-dimensional sphere CS. Assuming that the spherical image CE generated in the way described above is a surface area of the sphere CS, the virtual camera IC is inside the spherical image CE as illustrated in FIG. 9. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. Zooming in or out of the predetermined area T may be implemented by bringing the virtual camera IC closer to or farther away from the spherical image CE. The predetermined-area image Q is the image of the predetermined area T in the spherical image CE. The predetermined area T is defined by an angle of view α of the virtual camera IC and a distance f from the virtual camera IC to the spherical image CE (see FIG. 11).

The predetermined-area image Q illustrated in FIG. 10A is displayed on a predetermined display as an image of the imaging area of the virtual camera IC, as illustrated in FIG. 10B. The image illustrated in FIG. 10B is a predetermined-area image represented by predetermined-area information that is set by default. A description will be made using the imaging direction (ea, aa) and the angle of view (α) of the virtual camera IC. In another example, the predetermined area T is not defined by the angle of view α and the distance f, and the imaging area of the virtual camera IC, which is the predetermined area T, is identified by position coordinates (X, Y, Z).

Figure 11:
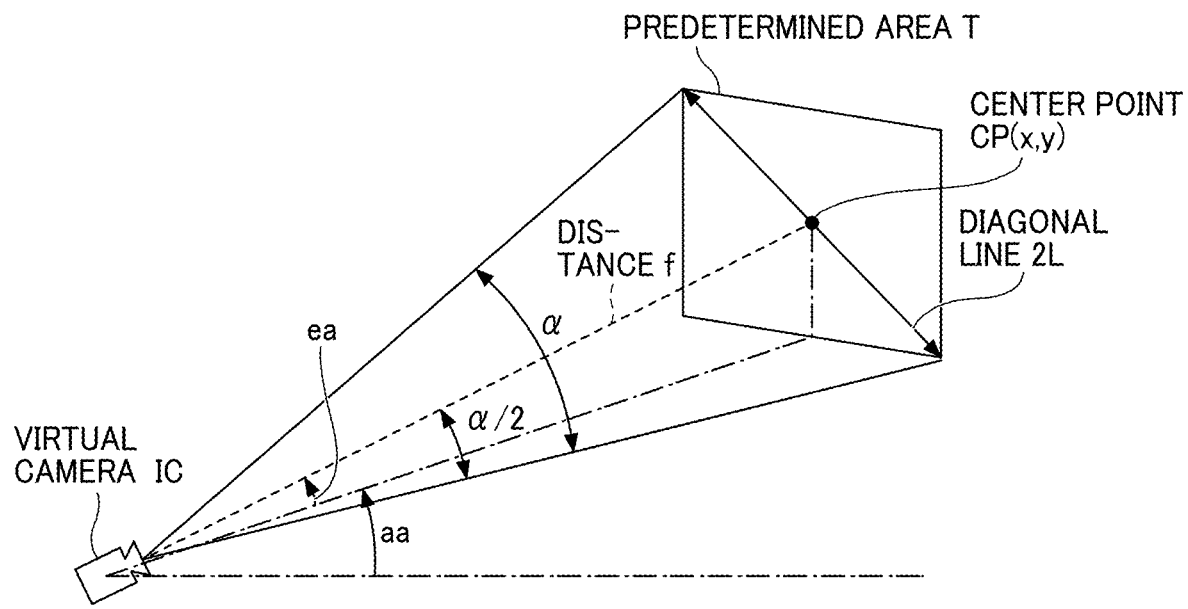
FIG. 11 is a view illustrating a relationship between predetermined-area information and the image of the predetermined area according to the embodiment.

Next, a relationship between the predetermined-area information and the image of the predetermined area T will be described with reference to FIG. 11. FIG. 11 illustrates a relationship between the predetermined-area information and the image of the predetermined area T. As illustrated in FIG. 11, "ea" denotes an elevation angle, "aa" denotes an azimuth angle, and "α" denotes an angle of view of the virtual camera IC. The position of the virtual camera IC is adjusted such that the point of gaze of the virtual camera IC, indicated by the imaging direction (ea, aa), matches a center point CP (x, y) of the predetermined area T serving as the imaging area of the virtual camera IC. As illustrated in FIG. 11, the center point CP (x, y) of the predetermined area T, whose diagonal angle of view is represented by the angle of view α of the virtual camera IC and is denoted by α, is used as a parameter (x, y) of the predetermined-area information. The predetermined-area image Q is the image of the predetermined area T in the spherical image CE. The distance f is a distance from the virtual camera IC to the center point CP (x, y) of the predetermined area T. The distance between the center point CP (x, y) and a given vertex of the predetermined area T is denoted by "L" (2L is a diagonal line). In FIG. 11, a trigonometric function generally expressed by Equation (1) below holds.

$$L/f = \tan(\alpha/2) \tag{1}$$

The image capturing apparatus 10 described above is an example of an image capturing apparatus for acquiring a wide-view image. The spherical image CE is an example of a wide-view image. The wide-view image is generally an image taken with a wide-angle lens such as a lens capable of taking a range wider than a range that the human eye can perceive.

Figure 12:
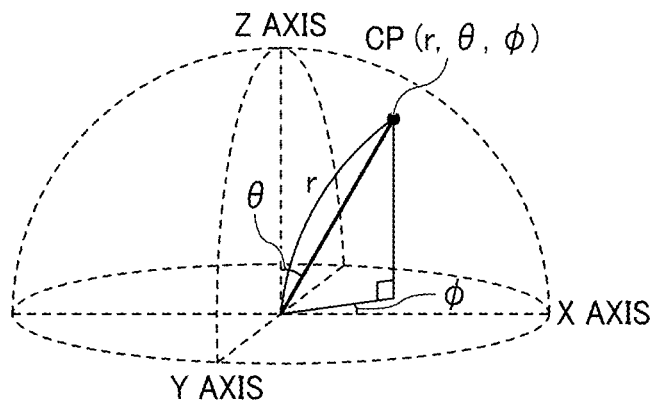
FIG. 12 is a view illustrating a point in a three-dimensional Euclidean space defined in spherical coordinates, according to the embodiment.

FIG. 12 illustrates the relationship illustrated in FIG. 11 using a point in a three-dimensional Euclidean space defined in spherical coordinates. The center point CP illustrated in FIG. 11 is represented by a spherical polar coordinate system to obtain position coordinates (r, θ, φ). The position coordinates (r, θ, φ) represent a radius vector, a polar angle, and an azimuth angle, respectively. The radius vector r is a distance from the origin of the three-dimensional virtual space including the spherical image CE to the center point CP. Accordingly, the radius vector r is equal to the distance f illustrated in FIG. 11. FIG. 12 illustrates the relationship illustrated in FIG. 11. In the following description, the position coordinates (r, θ, φ) of the virtual camera IC are used as an example of point-of-view information. As described above, the point-of-view information is any parameter information that can define the predetermined area T (the predetermined-area image Q) displayed on the predetermined display illustrated in FIG. 10A as the image of the imaging area of the virtual camera IC. The point-of-view information includes the coordinates of the diagonal vertices of the predetermined area T. In one example, the point-of-view information includes information indicating the angle of view α of the virtual camera IC and information indicating the center point CP (x, y), which have been described with reference to FIG. 11. Examples of the point-of-view information include position coordinate information in the form of spherical coordinates, position coordinate information in the form of orthogonal coordinates, and a difference value between the predetermined-area information that is set by default and the coordinates. Other examples of the point-of-view information include information other than coordinate information, such as an angle and/or a distance, as illustrated in FIG. 11. In FIGS. 11 and 12, the center point CP of the predetermined area T is illustrated as a reference. In another example, the predetermined area T may be defined by parameter information with any one of the vertices of the predetermined area T as a reference. In the foregoing description of the point-of-view information, as a non-limiting example, the wide-view image is a spherical image. In any other wide-view image, information that defines the predetermined area T in the other wide-view image is point-of-view information.

Functions

Figure 13:
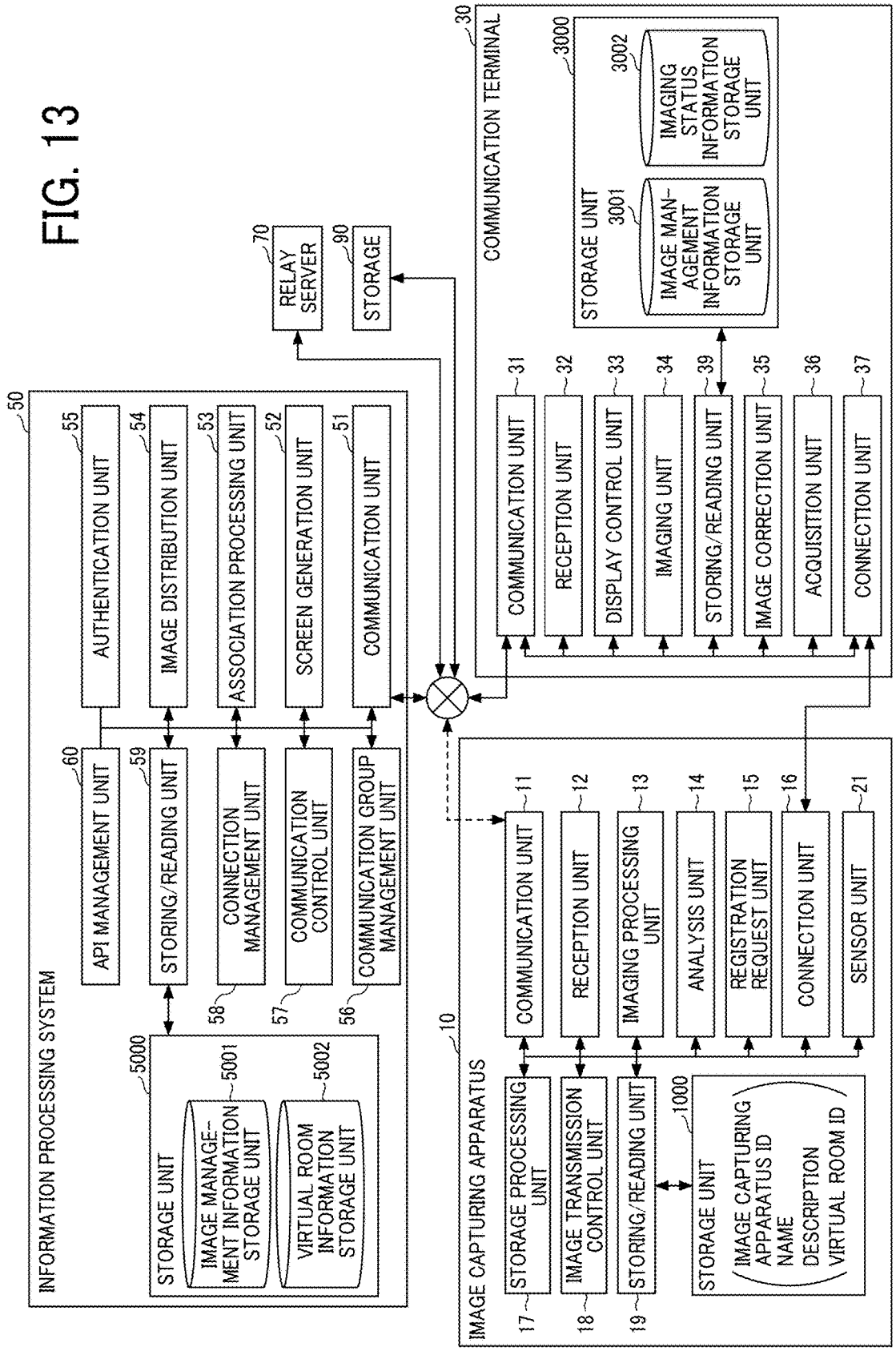
FIG. 13 is a diagram illustrating an example functional configuration of the communication system.

Next, the functional configuration of the communication system 1 according to this embodiment will be described with reference to FIG. 13. FIG. 13 is a diagram illustrating an example functional configuration of the communication system 1 according to this embodiment. FIG. 13 illustrates functions, related to processes or operations described below, of the terminals, the apparatus, and the server illustrated in FIG. 1.

Functional Configuration of Image Capturing Apparatus

First, the functional configuration of the image capturing apparatus 10 will be described with reference to FIG. 13. The image capturing apparatus 10 includes a communication unit 11, a reception unit 12, an imaging processing unit 13, an analysis unit 14, a registration request unit 15, a connection unit 16, a storage processing unit 17, an image transmission control unit 18, a storing/reading unit 19, and a sensor unit 21. Each of these units is a function or means that is implemented by or caused to function by any one or more of the hardware elements illustrated in FIG. 3 operating in accordance with instructions from the CPU 111 according to a program loaded onto the SRAM 113 or the DRAM 114. The image capturing apparatus 10 further includes a storage unit 1000, which is implemented by the ROM 112 and the like illustrated in FIG. 3.

The communication unit 11 is a function of connecting to the communication network N by using wireless communication technology such as Wi-Fi® to transmit and receive various types of data or information to and from another apparatus. In this embodiment, the connection unit 16 transmits a wide-view image acquired by the imaging processing unit 13 to the information processing system 50. In some embodiments, the communication unit 11 may transmit the wide-view image to the information processing system 50.

The reception unit 12 is a function of receiving an operation input to the image capturing apparatus 10 from the user. The reception unit 12 receives the operation of turning on or off the power, turning on or off a shutter button (start or stop of transmission of the wide-view image), or the like.

The imaging processing unit 13 captures an image of an object or surroundings such as scenery and acquires a captured image. The captured image acquired by the imaging processing unit 13 may be either or both of a moving image and a still image. In another example, the captured image may include an image and audio. Further, for example, the imaging processing unit 13 captures an image of a two-dimensional code displayed on the display 306 of the communication terminal 30.

The analysis unit 14 analyzes the two-dimensional code, of which the image is captured by the imaging processing unit 13, to extract information included in the two-dimensional code. The extracted information includes a URL for registering the image capturing apparatus 10 in the tenant, a temporary ID, and a password.

The registration request unit 15 transmits a request to the information processing system 50 to register the image capturing apparatus 10 in the tenant in the information processing system 50, by using the information included in the two-dimensional code read by the analysis unit 14.

The connection unit 16 is a function of receiving a supply of power from the communication terminal 30A and performing data communication. The connection unit 16 is implemented by, for example, the short-range communication circuit 117.

The storage processing unit 17 performs a process of storing a wide-view image captured in response to an image capturing request from any site in a URL (e.g., the storage 90) transmitted from the information processing system 50.

The image transmission control unit 18 is a function of controlling transmission of the wide-view image to the information processing system 50. For example, the image transmission control unit 18 transmits a captured image acquired by the imaging processing unit 13 to the information processing system 50 periodically or in response to a user operation when the captured image is a still image, or at a predetermined frame rate (expressed in frames per second or FPS) when the captured image is a moving image. The image transmission control unit 18 also performs switching between the communication unit 11 and the connection unit 16.

The sensor unit 21 controls the electronic compass 118, the gyro sensor 119, the acceleration sensor 120, and the GPS receiver 121 and acquires signals from the electronic compass 118, the gyro sensor 119, the acceleration sensor 120, and the GPS receiver 121. In one embodiment, the sensor unit 21 controls the GPS receiver 121 to acquire location information of the image capturing apparatus 10, controls the gyro sensor 119 to acquire the three-dimensional orientation of the image capturing apparatus 10, and controls the acceleration sensor 120 to acquire a tilt of the image capturing apparatus 10.

The storing/reading unit 19 is a function of storing various types of data in the storage unit 1000 or reading various types of data from the storage unit 1000. The storage unit 1000 stores captured image data acquired by the imaging processing unit 13, an image capturing apparatus ID, and the like. The captured image data stored in the storage unit 1000 may be deleted when a predetermined amount of time has elapsed after the captured image data was acquired by the imaging processing unit 13, or the data transmitted to the information processing system 50 may be deleted.

The image capturing apparatus 10 has installed therein an application (also referred to as a plug-in) for supporting the communication system 1. The application is not used when the image capturing apparatus 10 is a commercially available image capturing apparatus, but otherwise is used to associate the image capturing apparatus 10 with the virtual room or to receive external control. Some of the functions illustrated in FIG. 13, such as the registration request unit 15, are implemented by the application.

Functional Configuration of Communication Terminal

Next, the functional configuration of the communication terminal 30 will be described with reference to FIG. 13. The communication terminal 30 includes a communication unit 31, a reception unit 32, a display control unit 33, an imaging unit 34, an image correction unit 35, an acquisition unit 36, a storing/reading unit 39, and a connection unit 37. Each of these units is a function or means that is implemented by or caused to function by any one or more of the hardware elements illustrated in FIG. 4 operating in accordance with instructions from the CPU 301 according to a program (either the web browser or a dedicated application) loaded onto the RAM 303. The communication terminal 30 further includes a storage unit 3000. The storage unit 3000 is implemented by the ROM 302 or the recording medium 315 illustrated in FIG. 4.

The communication unit 31 is a function of connecting to the communication network N and transmitting and receiving various types of data or information to and from another apparatus. The communication unit 31 is implemented by, for example, the network I/F 309.

The reception unit 32 is a function of receiving various selections or operation inputs to the communication terminal 30. The display control unit 33 is a function of causing the display 306 of the communication terminal 30 to display a wide-view image or an image having a normal angle of view and various screens. For example, the display control unit 33 causes the display 306 to display a two-dimensional code transmitted from the information processing system 50. In one example, the two-dimensional code is QR Code®, DataMatrix (DataCode), MaxiCode, or Portable Document Format (PDF). In another example, the two-dimensional code is a barcode.

The image correction unit 35 corrects a wide-view image captured when the image capturing apparatus 10 is installed in a different position to a wide-view image whose point of view is the original position. The details will be described below.

The acquisition unit 36 acquires imaging status information from an imaging status information storage unit 3002 through the storing/reading unit 39. In one embodiment, the imaging status information storage unit 3002 is included in the image capturing apparatus 10, the information processing system 50, or a relay server 70. In this case, the acquisition unit 36 acquires the imaging status information through the communication unit 31.

The connection unit 37 is a function of supplying power to the image capturing apparatus 10 and performing data communication. The connection unit 37 is implemented by, for example, the short-range communication circuit 320.

The storing/reading unit 39 is a function of storing various types of data in the storage unit 3000 or reading various types of data from the storage unit 3000 in accordance with instructions from the CPU 301 illustrated in FIG. 4. The storage unit 3000 includes an image management information storage unit 3001 and the imaging status information storage unit 3002. The image management information storage unit 3001 will be described in the description of the information processing system 50. The imaging status information storage unit 3002 will be described with reference to FIG. 25.

Functional Configuration of Information Processing System

Next, the functional configuration of the information processing system 50 will be described. The information processing system 50 includes a communication unit 51, a screen generation unit 52, an association processing unit 53, an image distribution unit 54, an authentication unit 55, a communication group management unit 56, a communication control unit 57, a connection management unit 58, a storing/reading unit 59, and an API management unit 60. Each of these units is a function or means that is implemented by or caused to function by any one or more of the hardware elements illustrated in FIG. 4 operating in accordance with instructions from the CPU 501 according to a program loaded onto the RAM 503. The information processing system 50 further includes a storage unit 5000. The storage unit 5000 is implemented by the ROM 502, the HDD 504, or the recording medium 515 illustrated in FIG. 4.

The communication unit 51 has a function of transmitting and receiving various types of data or information to and from another apparatus via the communication network N.

The screen generation unit 52 generates screen information to be displayed on the communication terminal 30. The screen information is created by Hypertext Markup Language (HTML), Extensible Markup Language (XML), Cascade Style Sheet (CSS), JavaScript®, or any other language for a web application to be executed by the communication terminal 30. For a native application to be executed by the communication terminal 30, the screen information is held by the communication terminal 30, and the information to be displayed is transmitted in XML or the like. The screen generation unit 52 generates screen information of a screen on which a wide-view image or the like to be distributed by the image distribution unit 54 is arranged.

The association processing unit 53 performs control related to sharing of the point-of-view information of the wide-view image. In response to receipt of an image capturing request together with the point-of-view information from the communication terminal 30, the association processing unit 53 performs a process of associating the point-of-view information with a wide-view image acquired from the image capturing apparatus 10 in response to the image capturing request. The association processing unit 53 stores the associated wide-view image and point-of-view information in an image management information storage unit 5001. Further, the association processing unit 53 transmits a URL, which is information indicating a storage location where the associated wide-view image and point-of-view information are to be stored, to the communication terminal 30. In one example, the information processing system 50) does not simultaneously receive the point-of-view information and the image capturing request from the communication terminal 30. The information processing system 50) separately receives the point-of-view information and the image capturing request and performs association processing. The URL is an example of information indicating the storage location. The information indicating the storage location may be in any other format such as a uniform resource identifier (URI).

The image distribution unit 54 distributes, to the communication terminal 30 operated by a user who is in the virtual room, a wide-view image transmitted from the image capturing apparatus 10 associated with the same virtual room.

An image having a normal angle of view captured by a camera included in the communication terminal 30 or the camera 8 or 9 connected to the communication terminal 30 is also distributed in a similar manner.

The authentication unit 55 is a function of authenticating an entity from which an authentication request is received by the communication unit 51. For example, the authentication unit 55 determines whether authentication information (a user ID and a password) included in the authentication request received by the communication unit 51 matches authentication information held in advance to perform user authentication. The authentication information may be a card number of an integrated circuit (IC) card, biometric authentication information such as a face, a fingerprint, and a voiceprint. The authentication unit 55 may perform authentication using an external authentication system or an authentication method such as Open Authorization (Oauth).

The communication group management unit 56 manages the entry of the communication terminal 30) and/or the user into the virtual room, association between the virtual room and a device, and the like. Upon successful authentication of the user by the authentication unit 55, the communication group management unit 56 registers the user ID and the Internet protocol (IP) address of the communication terminal 30 in a virtual room information storage unit 5002 or associates the image capturing apparatus 10 with the virtual room.

The communication control unit 57 manages the start, establishment, and end of communication with the image capturing apparatus 10 associated with each virtual room. The communication control unit 57 also manages the start, establishment, and end of communication for distributing a wide-view image and audio in response to the communication terminal 30 entering or leaving the virtual room.

The connection management unit 58 manages communication (connection) established with the information processing system 50 by the communication terminal 30 and the image capturing apparatus 10 in association with the virtual room.

The API management unit 60 manages an API to be used by a platform contractor to provide an image distribution service of a wide-view image. In the use of the API, the platform contractor develops software for calling the API. The software to be developed may operate on a server or may operate on a client such as a communication terminal. Any of the functions of the information processing system 50, such as the image distribution unit 54, the association processing unit 53, and the communication control unit 57, can be provided as an API. Any function added to the information processing system 50 later may be provided as an API. To determine whether to provide a function as an API, a communication terminal operated by the platform provider accesses the information processing system 50 and receives the public settings of the API. As a result, the API management unit 60 can control the API based on the public settings. The API management unit 60 may perform an authentication process for checking whether software operating on a requesting entity that makes a request to call the API is software developed by an authorized platform contractor. In one embodiment, the authentication process is performed by comparing information stored in a platform contractor information storage unit with information transmitted from the software operating on the requesting entity. In a specific example of the authentication process, the information processing system 50 receives, from the software operating on the requesting entity, an application ID issued to the software developed by the platform contractor in advance by the API management unit 60. If the API management unit 60 determines that the application ID matches an application ID stored in the platform contractor information storage unit, the API management unit 60) performs control to give permission to provide an API since the software developed by the platform contractor is determined as being valid. If the software developed by the platform contractor is not determined as being valid, the API management unit 60 performs control not to give permission to provide an API. The application ID is an example of authentication information for determining validity. The API management unit 60 may use authentication information issued in advance by the API management unit 60 of the information processing system 50 or by an external system to check the validity of the requesting entity. Examples of such authentication information as issued in advance include an access token, a ticket, a security key, a password, and a personal identification (PIN) code. In this embodiment, while the mode of using a function of the information processing system 50 as an API is not described, the same process flow is performed, except that software such as an application developed by a platform contractor uses a function of the information processing system 50 through a determination made by the API management unit 60.

The storing/reading unit 59 is a function of storing various types of data in the storage unit 5000 or reading various types of data from the storage unit 5000. The storage unit 5000 includes the image management information storage unit 5001 and the virtual room information storage unit 5002.

Image Management Information Storage Unit 5001

FIG. 14A is a table illustrating image management information stored in the image management information storage unit 5001. The image management information storage unit 5001 stores image management information as illustrated in FIG. 14A. The image management information is information for managing wide-view images captured in response to image capturing requests. In response to a user transmitting an image capturing request from the communication terminal 30, image management information for one record is generated. The items contained in the image management information will be described.

The item "data ID" is identification information that identifies a wide-view image. The information processing system 50 numbers each data ID. ID is an abbreviation for identification and means an identifier or identification information. ID is any one or a combination of two or more of a name, a symbol, a character string, and a numerical value that are used for uniquely identifying a specific object from among a plurality of objects.

The item "data name" is the name of a wide-view image set by the user of the communication terminal 30. Each data name may be set by the user or automatically.

The item "imaging date and time information" is information that specifies the imaging date and time of a wide-view image. Examples of the imaging date and time include the date and time when the user input an image capturing request to the communication terminal 30, and the date and time when the image capturing apparatus 10 captured a wide-view image. The imaging date and time information may be a time stamp of a wide-view image.

The item "imaging operator information" is identification information (or a user name) of a user (imaging operator) who has input an image capturing request to the communication terminal 30. Since a user inputs an image capturing request to the communication terminal 30 after entering the virtual room, a user registered in the imaging operator information is identified by authentication to the information processing system 50 or the virtual room. The imaging operator information is transmitted to the information processing system 50 together with an image capturing request.

The item "image capturing apparatus information" is identification information (image capturing apparatus ID) of the image capturing apparatus 10 that has captured a wide-view image. The information processing system 50 numbers each image capturing apparatus ID and shares the image capturing apparatus ID with the image capturing apparatus 10. The image capturing apparatus ID may be information unique to the image capturing apparatus 10, such as a media access control (MAC) address or a serial number. The image capturing apparatus ID is transmitted to the information processing system 50 together with the associated wide-view image.

The item "imaging operator's point-of-view information" is point-of-view information including a radius vector, a polar angle, and an azimuth angle. The point-of-view information indicates the coordinates of the center of the wide-view image being displayed on the communication terminal 30. The point-of-view information is transmitted from the communication terminal 30 that makes an image capturing request. In one embodiment, the point-of-view information includes information designating the width and height of the display range, in addition to the radius vector, the polar angle, and the azimuth angle. In another embodiment, the point-of-view information does not include the radius vector, the polar angle, and the azimuth angle, and includes the width and height of the display range.

The item "imaging-time virtual room ID" is identification information of a virtual room associated with the image capturing apparatus 10.

The item "data storage location information" is a URL, a file path, or any other location where a wide-view image is stored.

FIG. 14B is also a table illustrating image management information. In FIG. 14B, wide-view images having the same imaging-time virtual room ID are stored. The image management information may be classified in units of virtual rooms.

Virtual Room Information Storage Unit 5002

FIG. 15 is a table illustrating virtual room information stored in the virtual room information storage unit 5002. The virtual room information storage unit 5002 stores virtual room information as illustrated in FIG. 15. The virtual room information is information related to a virtual room. The virtual room information is held for each virtual room. The items contained in the virtual room information will be described. The virtual room is registered in the tenant.

The item "virtual room ID" is identification information that identifies the virtual room. In this embodiment, each virtual room can be created by a user as appropriate.

The item "virtual room name" is a name for the user to identify the virtual room. Each virtual room name can be set by a user as appropriate.

The item "device information" is identification information of a device associated with the virtual room. In one example, the identification information is the image capturing apparatus ID of the image capturing apparatus 10 serving as such a device.

The item "user in virtual room" is the user ID of a user who has entered and is currently in the virtual room. The user is a user authorized to view a wide-view image. The method for entering a virtual room will be described below. The user ID is associated with the IP address of the communication terminal 30 operated by the user.

The item "storage" is information regarding a storage associated with the virtual room.

Relay Server

The relay server 70 is an information processing apparatus that relays a wide-view image and audio transmitted from the image capturing apparatus 10 to the communication terminal 30 on the receiver side in the communication system 1. Further, the relay server 70 relays point-of-view information and the like from one of the communication terminals 30, from which the point-of-view information and the like are transmitted, to the image capturing apparatus 10 and/or another communication terminal 30. The relay server 70 may be omitted. However, the relay server 70 facilitates control of communication between the image capturing apparatus 10 and the communication terminals 30.

Entry of Communication Terminal into Virtual Room

Next, a process in which the user B enters the virtual room will be described with reference to FIGS. 16A, 16B, and 17. In the illustrated example, the image capturing apparatus 10 has already been associated with the virtual room, and the communication terminal 30A has transmitted a wide-view image and an image having a normal angle of view to the information processing system 50. In the following description, no distinction is made between the entry of the user B into the virtual room and the entry of the communication terminal 30B, which is operated by the user B, into the virtual room.

Figure 16A:
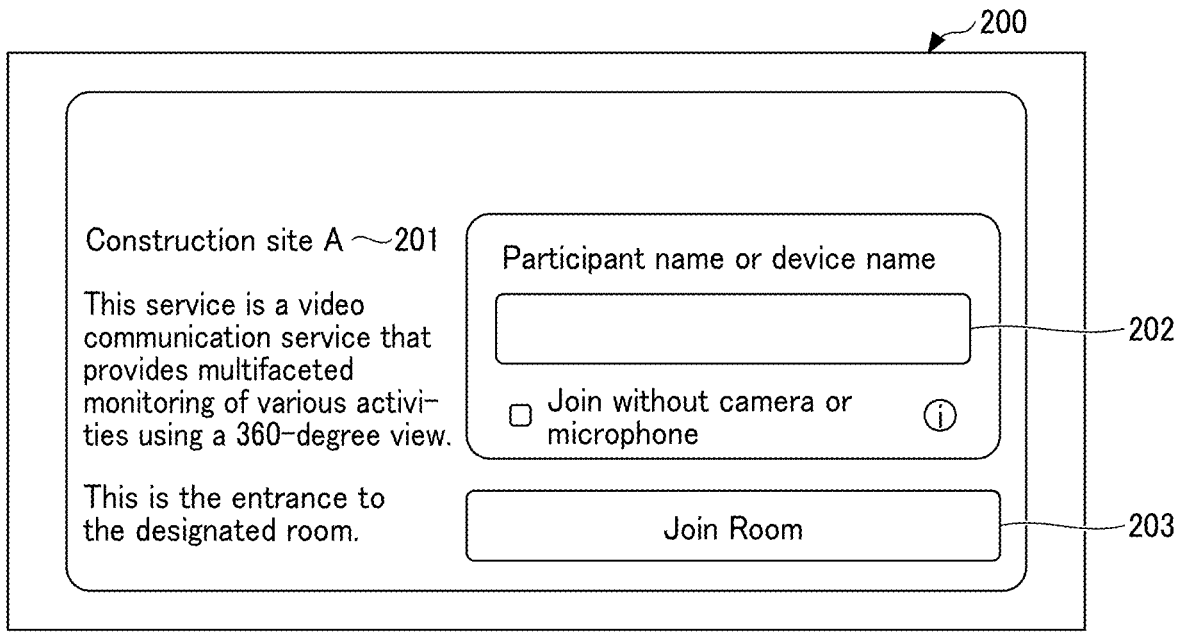
FIG. 16A is a view illustrating an example of a room entry screen.
Figure 16B:
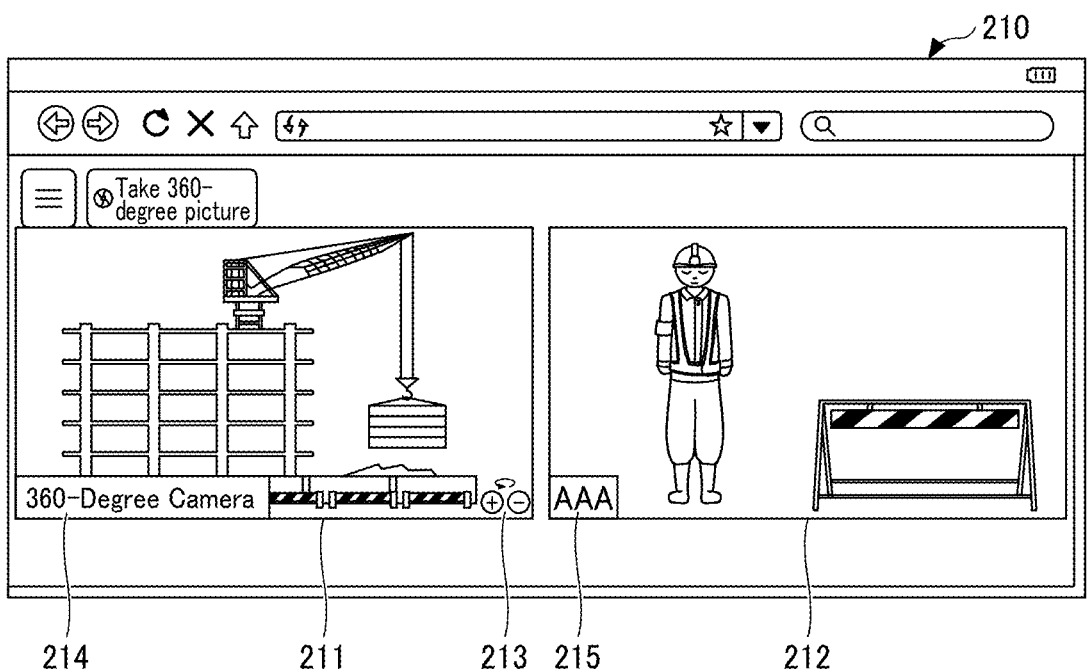
FIG. 16B is a view illustrating an example of an image viewing screen displayed on the communication terminal in response to a user entering a virtual room.

FIGS. 16A and 16B illustrate examples of a screen displayed on the communication terminal 30B when the user B is to enter the virtual room. FIG. 16A illustrates an example of a room entry screen 200. Prior to the display of the room entry screen 200, the user B logs into the information processing system 50. Upon the login of the user B, the tenant to which the user B belongs is identified. Virtual rooms are associated with the tenant. A list of virtual rooms associated with the tenant is displayed on the communication terminal 30B, and the user B selects a virtual room that the user B is to enter from the list. FIG. 16A illustrates the room entry screen 200 for the virtual room selected by the user B.

Alternatively, the creator of the virtual room may request the information processing system 50 to issue a URL corresponding to the virtual room, and the URL may be transmitted to the user B via email or any other means. In response to the user B clicking on the URL displayed on the communication terminal 30B, the communication terminal 30B displays the room entry screen 200 illustrated in FIG. 16A.

The room entry screen 200 includes a virtual room name 201, a participant name input field 202, and a room entry button 203. The virtual room name 201 is the same as that stored in the virtual room information storage unit 5002. The participant name input field 202 may include a name such as a nickname of the user B. Upon the login of the user B, the user name of the user B is identified. The identified user name may be automatically displayed. The room entry button 203 is a button for the user B to send a request to enter the virtual room.

At the time of entry into the virtual room, authentication for entering the virtual room may be requested separately from the login to the tenant.

FIG. 16B illustrates an image viewing screen 210 displayed on the communication terminal 30B upon the user B entering the virtual room. The image viewing screen 210 illustrated in FIG. 16B indicates that the image capturing apparatus 10 has already started distributing a wide-view image and that the communication terminal 30A has already started distributing an image having a normal angle of view. The image viewing screen 210 includes a first image field 211 and a second image field 212. The first image field 211 displays the wide-view image, and the second image field 212 displays the image having a normal angle of view. In one example, images are transmitted from three or more sites. The image viewing screen 210 is divided into a number of portions corresponding to the number of sites from which images are transmitted.

The first image field 211 displays a wide-view image mark 213. The wide-view image mark 213 is set by the screen generation unit 52 of the information processing system 50 upon determination that the image to be displayed in the first image field 211 is a wide-view image. The determination may be made by the communication terminal 30B, and the communication terminal 30B may display the wide-view image mark 213. The wide-view image mark 213 allows the user B to know that the point of view can be changed.

The first image field 211 also displays a device name 214. The device name 214 is transmitted from the image capturing apparatus 10 together with the wide-view image. In one embodiment, the device name 214 is set by the user A in advance.

The second image field 212 displays a participant name 215. The participant name 215 is a user name. The participant name of a user who has already entered the virtual room is displayed in the participant name input field 202. In the illustrated example, since the user A has already entered the virtual room, "AAA", which is entered by the user A in the participant name input field 202, is displayed as the participant name 215.

Figure 17:
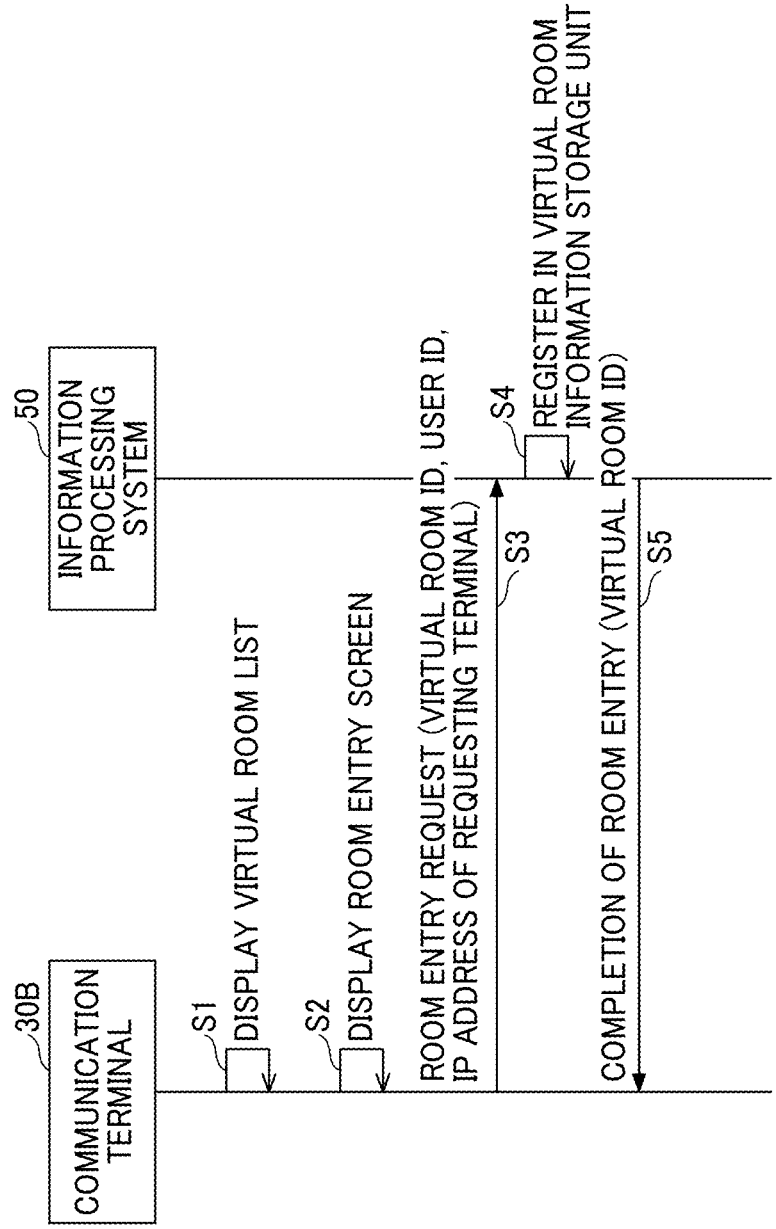
FIG. 17 is a sequence diagram illustrating an example process in which the user (or the communication terminal) enters the virtual room.

FIG. 17 is a sequence diagram illustrating a process in which the user B (or the communication terminal 30B) enters the virtual room.

S1: First, the user B at the site B performs an operation of displaying a virtual room list screen. In response to the reception unit 32 receiving the operation of displaying the virtual room list screen, the display control unit 33 of the communication terminal 30B causes the display 306 to display a selection screen.

S2: In response to the user B selecting a selection button for one of the virtual rooms, the reception unit 32 of the communication terminal 30B receives the selection of the virtual room. The display control unit 33 of the communication terminal 30B causes the display 306 to display the room entry screen 200.

S3: The user B completes the items and then presses the room entry button 203. In response to the reception unit 32 receiving the pressing of the room entry button 203, the communication unit 31 of the communication terminal 30B transmits a request to the information processing system 50 to enter the virtual room. The request for entering the virtual room includes a virtual room ID indicating the virtual room selected in step S2, the user ID of the user B, who is a login user, and the IP address of the communication terminal 30B from which the request is transmitted.

S4: The communication unit 51 of the information processing system 50 receives the request for entering the virtual room. The communication group management unit 56 registers the IP address and the user ID of the login user in the virtual room information identified by the virtual room ID in the virtual room information storage unit 5002.

S5: The communication unit 51 of the information processing system 50 transmits, to the communication terminal 30B, a notification of the completion of the entry to the virtual room. Then, the communication unit 31 of the communication terminal 30B receives the notification of the completion of the entry to the virtual room.

Association of Image Capturing Apparatus with Room

Next, an association of the image capturing apparatus 10 with a virtual room will be described with reference to FIGS. 18 to 22. In one example, the user A at the site A associates the image capturing apparatus 10 with a virtual room. In another example, a system administrator, a tenant administrator, or the like associates the image capturing apparatus 10 with a virtual room.

Figure 18:
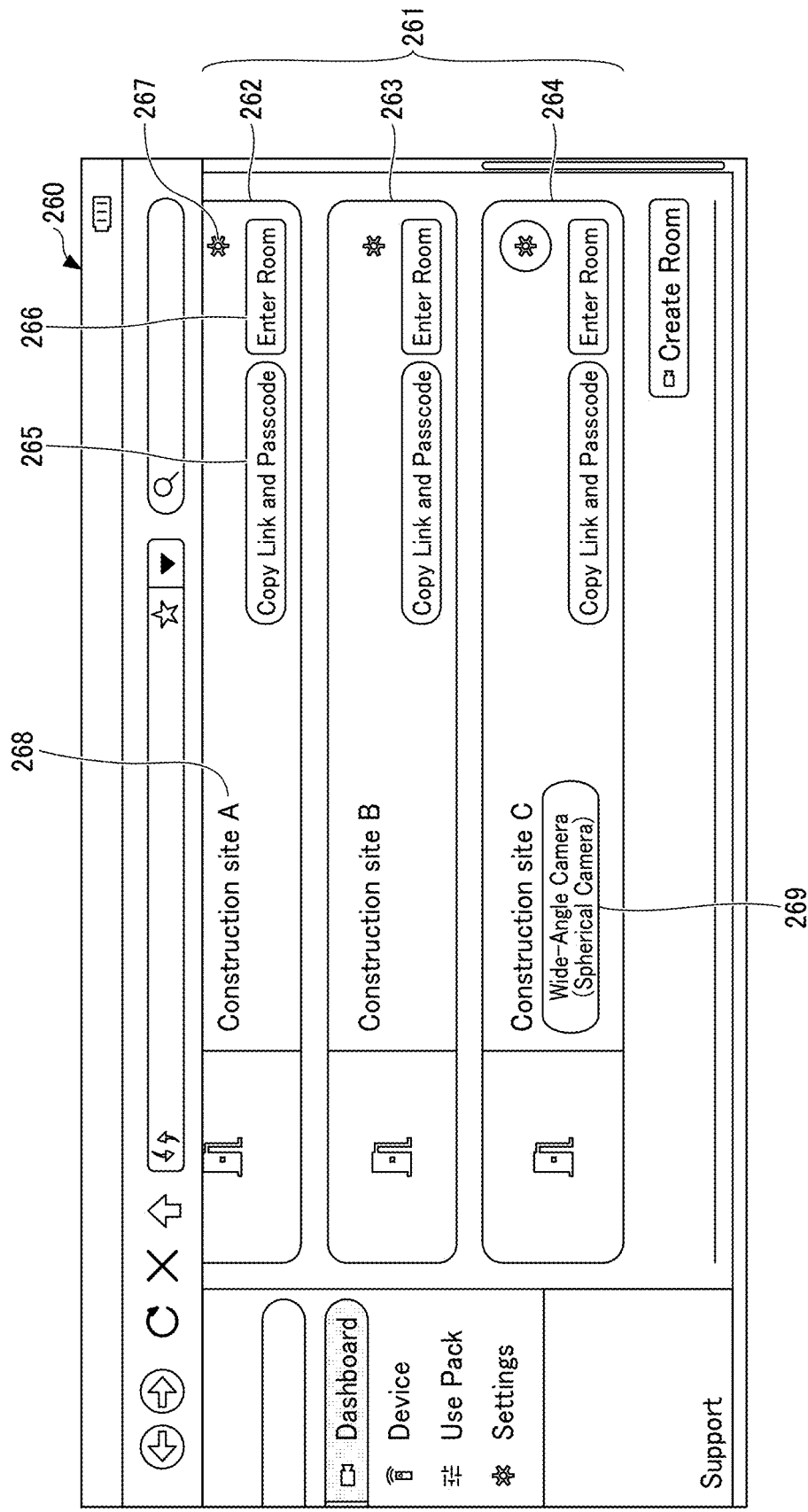
FIG. 18 is a view illustrating an example of a first virtual room association screen for associating an image capturing apparatus with a virtual room.

FIG. 18 illustrates an example of a first virtual room association screen 260 for associating the image capturing apparatus 10 with a virtual room. The same screen configuration may be used for the VR goggles 89 and the smart glasses 88. The first virtual room association screen 260 includes a virtual room list 261. The virtual room list 261 displays individual virtual room fields 262 to 264, based on virtual rooms created in the tenant. Each of the individual virtual room fields 262 to 264 includes a link issuance button 265, a room entry button 266, a settings button 267, and a virtual room name 268. The link issuance button 265 is a button for issuing a link (a URL for invitation) to the corresponding virtual room and a passcode. The room entry button 266 is a button for the user A to enter the virtual room. The settings button 267 is a button for associating the image capturing apparatus 10 with the virtual room. The virtual room name 268 is the same as that stored in the virtual room information storage unit 5002. The user A presses the settings button 267. In response to the pressing of the settings button 267, the communication terminal 30A displays a second virtual room association screen 270 illustrated in FIG. 19.

If a device has already been associated with the virtual room, a name 269 of the device is displayed in the individual virtual room field (in FIG. 18, the individual virtual room field 264).

Figure 19:
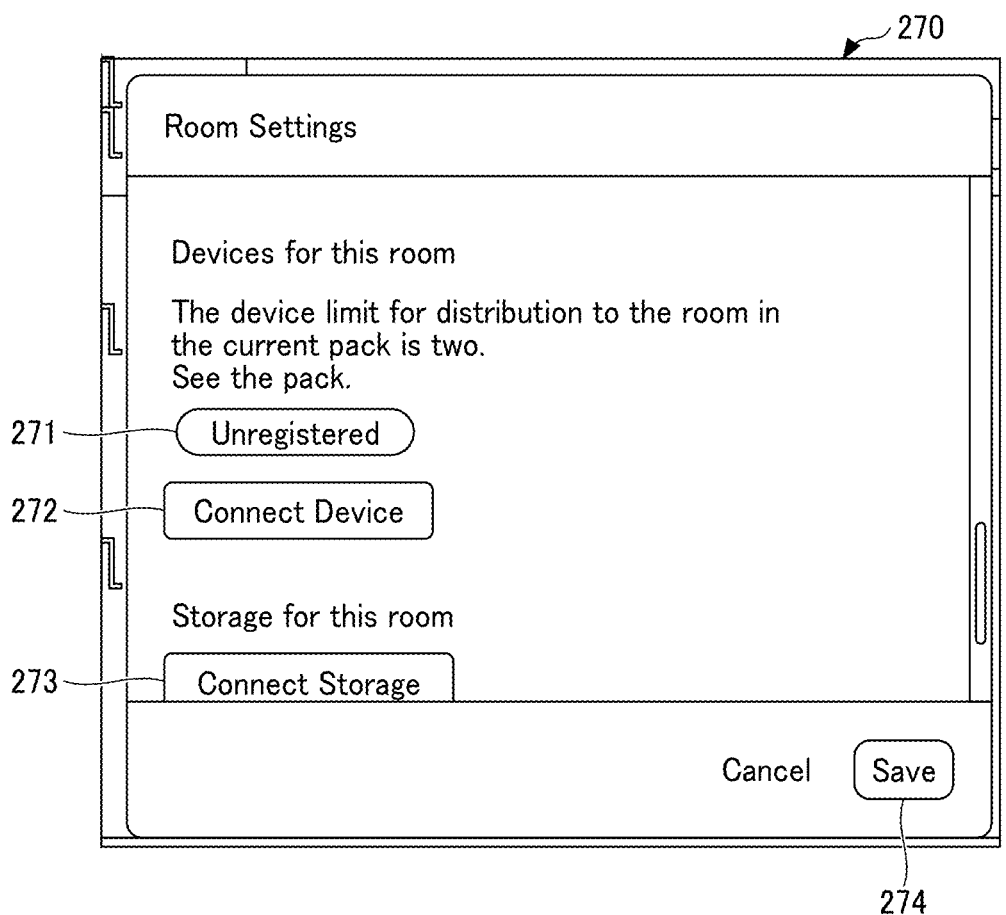
FIG. 19 is a view illustrating an example of a second virtual room association screen.

FIG. 19 illustrates an example of the second virtual room association screen 270. The second virtual room association screen 270 is displayed as a pop-up on the first virtual room association screen 260. In one example, the screen transition from the first virtual room association screen 260 to the second virtual room association screen 270 is not made through the information processing system 50. In another example, the screen transition from the first virtual room association screen 260 to the second virtual room association screen 270 is made through the information processing system 50.

The second virtual room association screen 270 includes a name 271 of the image capturing apparatus 10 that is currently (or has already been) associated with the virtual room, a connection button 272, and a storage button 273. In FIG. 19, the name 271 is set unregistered because the image capturing apparatus 10 is not registered yet. The connection button 272 is a button for displaying a list of devices registered in the tenant. The storage button 273 is a button for displaying a list of storages 90 to store a wide-view image captured by the image capturing apparatus 10 associated with the virtual room. In response to the pressing of the connection button 272, the communication terminal 30A displays a third virtual room association screen.

The communication terminal 30A transmits a virtual room ID to the information processing system 50 and acquires the name (or ID) of a device registered in the tenant for which the virtual room is generated and the name (or ID) of a device associated with the virtual room.

Figure 20:
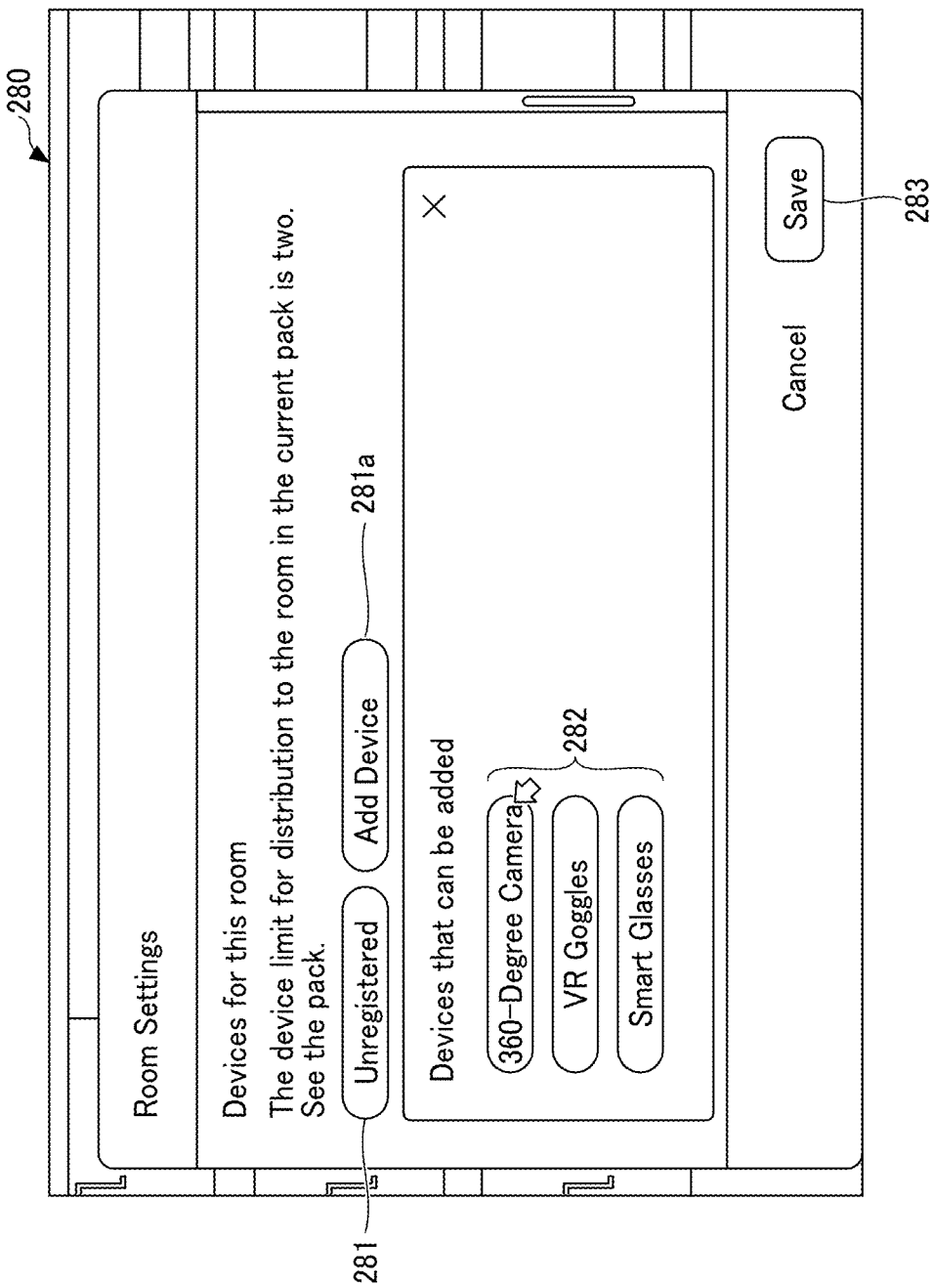
FIG. 20 is a view illustrating an example of a third virtual room association screen.

FIG. 20 illustrates an example of a third virtual room association screen 280. The third virtual room association screen 280 includes a name 281 of the image capturing apparatus 10 that is currently (or has already been) associated with the virtual room, a list of devices 282 that can be added, and a "Save" button 283. The user A selects a device to be associated with the virtual room from the list of devices 282 that can be added and then presses the "Save" button 283. As a result, the selected device is associated with the virtual room. That is, the corresponding image capturing apparatus ID is registered in the virtual room information storage unit 5002.

Wide-View Image Transmission Start Process for Image Capturing Apparatus

In the way described above, a device such as the image capturing apparatus 10 is associated with the virtual room. The user A operates the device to start transmitting an image.

For the VR goggles 89 and the smart glasses 88, the user A operates the device main body to turn on or off the transmission of an image. This is because no application dedicated to the communication system 1 is currently operating on the VR goggles 89 or the smart glasses 88.

If an application dedicated to the communication system 1 operates on the VR goggles 89 and the smart glasses 88, the user A can also remotely turn on or off the transmission of an image.

For the image capturing apparatus 10, when the application is enabled, the user A can turn on or off the transmission of the wide-view image from the menu of the application after entering the virtual room.

Figure 21A:
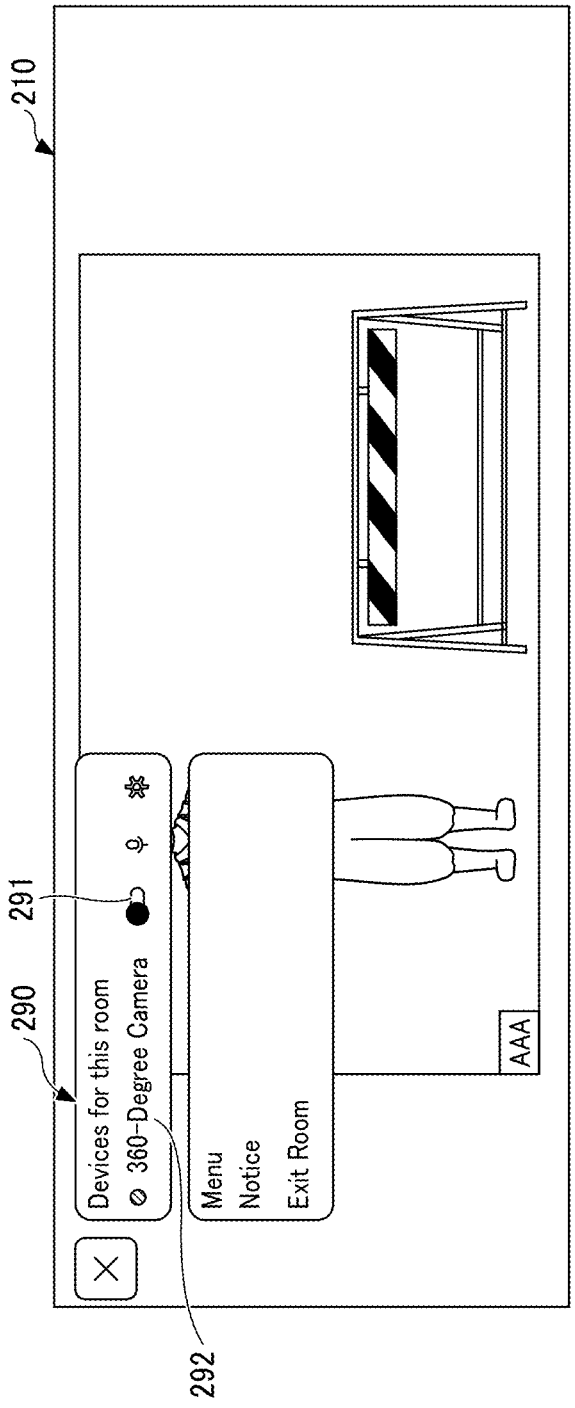
FIGS. 21A and 21B are views illustrating examples of a wide-view image transmission start/stop dialog displayed on the communication terminal.
Figure 21B:
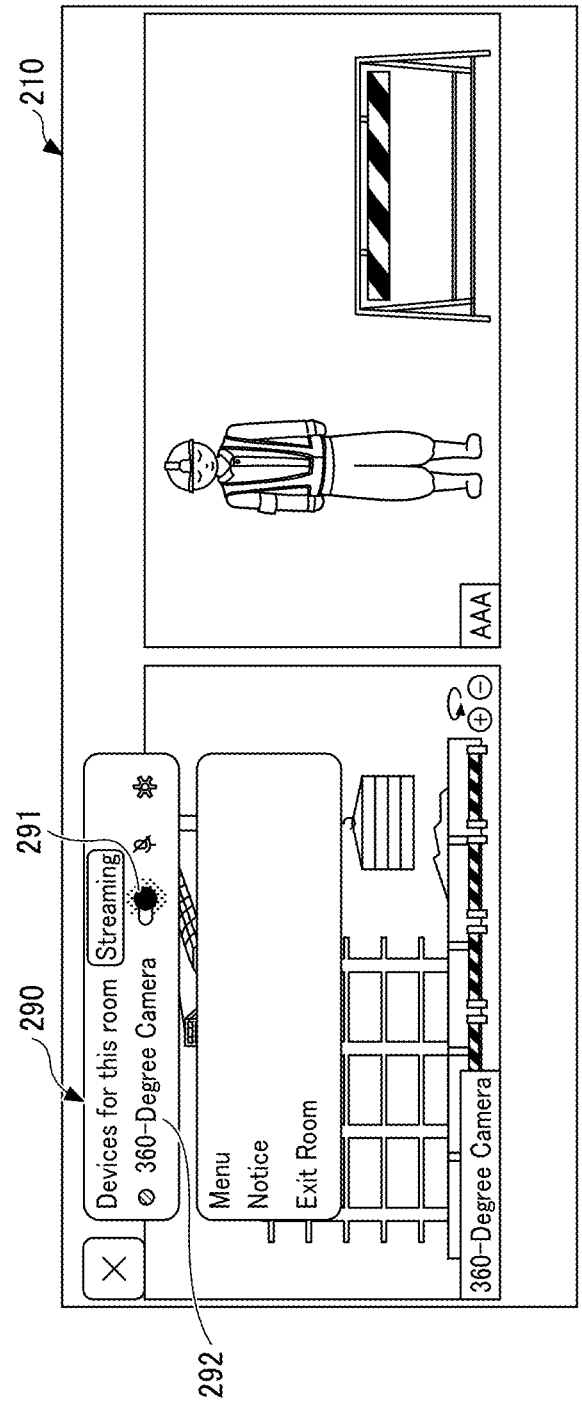

FIGS. 21A and 21B illustrate examples of a wide-view image transmission start/stop dialog 290 displayed on the communication terminal 30A. The wide-view image transmission start/stop dialog 290 is displayed as a pop-up on the image viewing screen 210. In the illustrated example, the user A has operated the communication terminal 30A and entered a virtual room associated with the image capturing apparatus 10. The wide-view image transmission start/stop dialog 290 displays a name 292 of the image capturing apparatus 10 associated with the virtual room. A toggle button 291 is displayed near the name 292. In one embodiment, the user A operates the toggle button 291 to turn on or off the transmission of the wide-view image captured by the image capturing apparatus 10. The turning on or off of the transmission using a toggle button is an example. The transmission of the wide-view image may be turned on or off in accordance with an input of a user operation. In one example, the user may turn on or off the transmission of the wide-view image by selecting a radio button or a predetermined icon or operating the menu. In another example, the transmission of the wide-view image is started automatically, without the user's operation, after the image capturing apparatus 10 enters the room. In another example, a predetermined condition such as the date and time, the number of users who have entered the room, and the participation of a specific user is determined in advance, and the transmission of the wide-view image is started in response to a determination that the predetermined condition is satisfied.

The communication terminal 30A transmits the state of the toggle button 291 to the information processing system 50. The information processing system 50 transmits a transmission start request or a transmission stop request corresponding to the state of the toggle button 291 to the image capturing apparatus 10.

FIG. 21A illustrates an off state of the toggle button 291. In FIG. 21A, thus, the wide-view image is not displayed. By contrast, the image having a normal angle of view captured by the camera 9 of the communication terminal 30A is displayed in the image viewing screen 210 in FIG. 21A since the image having a normal angle of view has already been shared at the time of entry of the communication terminal 30A into the virtual room.

FIG. 21B illustrates an on state of the toggle button 291. In response to turning on of the toggle button 291, the information processing system 50 transmits a transmission start request to the image capturing apparatus 10. Accordingly, the image capturing apparatus 10 starts transmitting the wide-view image. Since two images are shared in one virtual room, the image viewing screen 210 is divided into two areas.

Procedure for Registering Image Capturing Apparatus in Virtual Room

Figure 22:
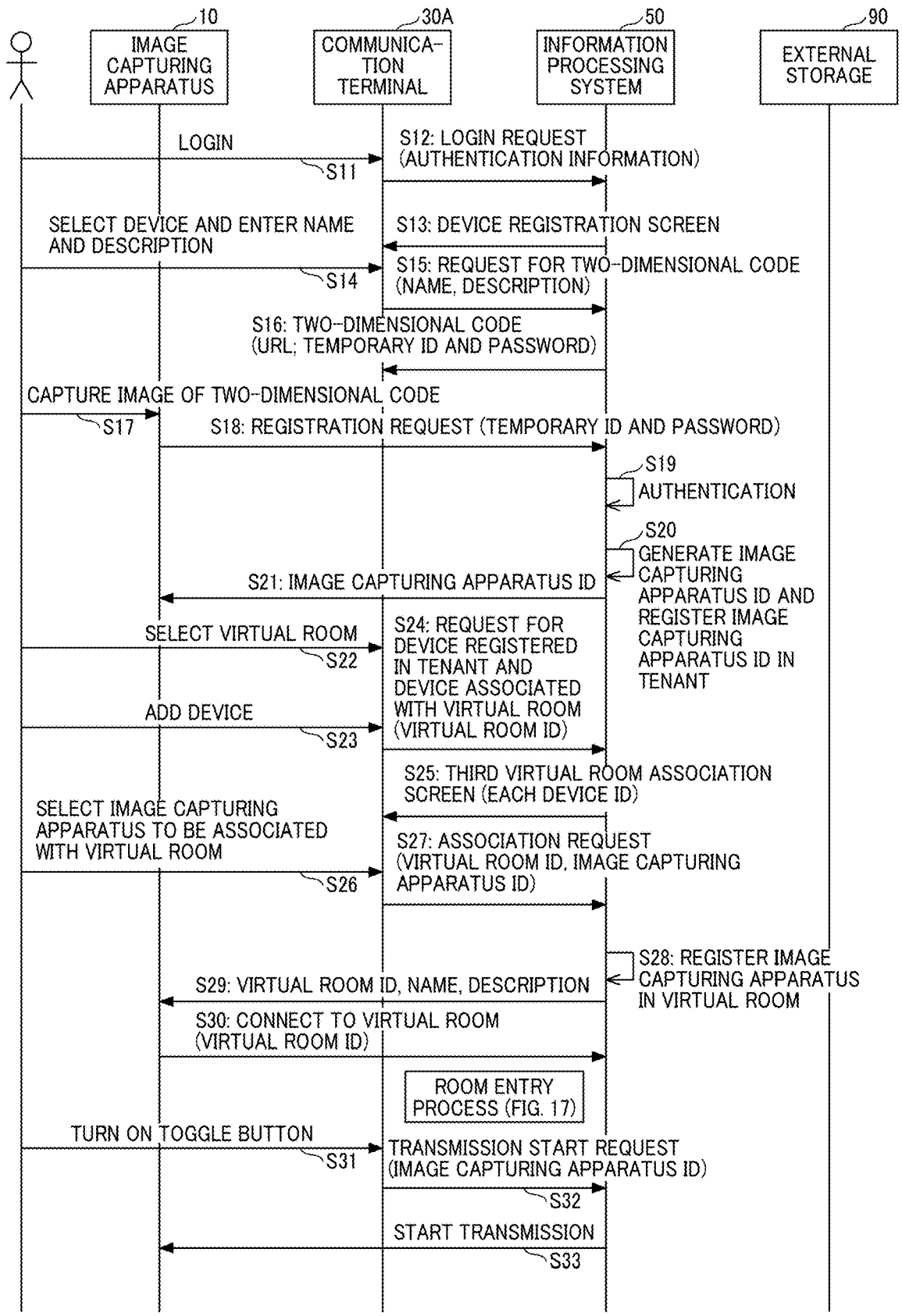
FIG. 22 is a sequence diagram illustrating an example procedure in which the user registers the image capturing apparatus in a virtual room.

Next, a procedure for registering the image capturing apparatus 10 in the virtual room illustrated in the screen transitions will be described with reference to FIG. 22. FIG. 22 is a sequence diagram illustrating an example procedure in which the user A registers the image capturing apparatus 10 in the virtual room.

S11: First, the user A connects the communication terminal 30A to the information processing system 50 and enters authentication information (such as a user ID and a password) to send a login request to log in the tenant to which the user A belongs. The reception unit 32 of the communication terminal 30A receives the operation.

S12: The communication unit 31 of the communication terminal 30A designates the authentication information and transmits the login request to the information processing system 50. In the information processing system 50, the communication unit 51 receives the login request, and the authentication unit 55 performs authentication. It is assumed that the authentication is successful.

S13: In the information processing system 50, the screen generation unit 52 generates a device registration screen in response to the user operation, and the communication unit 51 transmits screen information of the device registration screen to the communication terminal 30A.

S14: In the communication terminal 30A, the communication unit 31 receives the screen information of the device registration screen, and the display control unit 33 displays the device registration screen. The user A selects the type of the device (in the illustrated example, the image capturing apparatus 10). Then, the user A enters the name and description of the image capturing apparatus 10. The reception unit 32 receives the entered information.

S15: The communication unit 31 of the communication terminal 30A designates the name and description entered by the user A and transmits a request for a two-dimensional code to the information processing system 50.

S16: The communication unit 51 of the information processing system 50 receives the request for a two-dimensional code. The communication group management unit 56 generates a URL (connection destination for registration) in association with the name and the description, and generates a two-dimensional code including the URL, a temporary ID, and a password. The communication unit 51 of the information processing system 50 transmits the two-dimensional code to the communication terminal 30A. In the communication terminal 30A, the communication unit 31 receives the two-dimensional code, and the display control unit 33 displays the two-dimensional code.

S17: The user A operates the image capturing apparatus 10 to be associated with the virtual room to capture an image of the two-dimensional code. The reception unit 12 of the image capturing apparatus 10 receives the operation.

S18: In the image capturing apparatus 10, the imaging processing unit 13 performs an operation of capturing an image including the two-dimensional code to generate image data, and the analysis unit 14 analyzes the image data to extract the URL, the temporary ID, and the password. Accordingly, the registration request unit 15 connects to the URL via the connection unit 16, designates the temporary ID and the password, and transmits a request for registering the image capturing apparatus 10 to the information processing system 50.

S19: In the information processing system 50, the communication unit 51 receives the temporary ID and the password, and the authentication unit 55 determines whether the received temporary ID and password match the temporary ID and password associated with the connected URL. It is assumed that the temporary ID and the password match.

S20: Since a request for registering the image capturing apparatus 10 has been made, the communication group management unit 56 of the information processing system 50 generates an image capturing apparatus ID and registers the image capturing apparatus ID in the tenant that the user A has logged in. The image capturing apparatus ID is associated with a name and/or a description.

S21: The communication unit 51 of the information processing system 50 transmits the image capturing apparatus ID to the image capturing apparatus 10. The connection unit 16 of the image capturing apparatus 10 receives the image capturing apparatus ID and stores the image capturing apparatus ID in the storage unit 1000.

S22: The communication terminal 30A is notified of the completion of the registration, and the user A starts associating the image capturing apparatus 10 with the virtual room in response to the notification. The user A selects, from the first virtual room association screen 260 displayed on the communication terminal 30A, a virtual room with which the user A desires to associate the image capturing apparatus 10 registered in the tenant. The reception unit 32 of the communication terminal 30A receives the selection of the virtual room.

S23: The user A displays the second virtual room association screen 270 on the communication terminal 30A and presses a button 281a to add a device (FIG. 20). The reception unit 32 of the communication terminal 30A receives the pressing of the button 281a to add a device.

S24: The communication unit 31 of the communication terminal 30A transmits to the information processing system 50 a request for devices registered in the tenant and devices associated with the virtual room ID selected in step S22.

S25: In the information processing system 50, the communication unit 51 receives the request for the devices registered in the tenant and the devices associated with the virtual room ID, and the screen generation unit 52 generates the third virtual room association screen 280 including the device IDs of the devices registered in the tenant and the devices associated with the virtual room ID. The communication unit 51 of the information processing system 50 transmits screen information of the third virtual room association screen 280 to the communication terminal 30A.

S26: In the communication terminal 30A, the communication unit 31 receives the screen information of the third virtual room association screen 280, and the display control unit 33 causes the third virtual room association screen 280 to be displayed.

The user A selects the image capturing apparatus 10 to be associated with the virtual room. The reception unit 32 of the communication terminal 30A receives the selection of the image capturing apparatus 10, and the image capturing apparatus ID is identified.

S27: The communication unit 31 of the communication terminal 30A designates the virtual room ID selected in step S22 and the image capturing apparatus ID selected in step S26, and transmits an association request to the information processing system 50.

S28: In the information processing system 50, the communication unit 51 receives the association request, and the communication group management unit 56 registers the image capturing apparatus 10 in the virtual room. That is, the communication group management unit 56 registers the image capturing apparatus ID in the virtual room information storage unit 5002.

S29: Since the image capturing apparatus ID is associated with the virtual room, the communication unit 51 of the information processing system 50 transmits the virtual room ID, the name, and the description to the image capturing apparatus 10. The information processing system 50 may transmit the virtual room ID, the name, and the description to the image capturing apparatus 10 by using a push notification or by using polling, which is performed by the image capturing apparatus 10. The connection unit 16 of the image capturing apparatus 10 receives the virtual room ID, the name, and the description and stores the virtual room ID, the name, and the description in the storage unit 1000. Accordingly, the image capturing apparatus 10 can attach the image capturing apparatus ID, the virtual room ID, the name, the description, and the like to a wide-view image to be transmitted.

S30: The communication terminal 30A and the information processing system 50 perform the room entry process illustrated in FIG. 17 to allow the communication terminal 30A to enter the virtual room associated with the image capturing apparatus 10.

S31: The communication terminal 30A is notified of the completion of the association, and, in response to the notification, the user A turns on the toggle button 291 for the image capturing apparatus 10 associated with the virtual room on the image viewing screen 210. The reception unit 32 of the communication terminal 30A receives the turn-on operation.

S32: The communication unit 31 of the communication terminal 30A designates the image capturing apparatus ID and transmits, to the information processing system 50, a request for starting transmission of the wide-view image. The user A may directly operate a button of the image capturing apparatus 10 to start transmitting the wide-view image. In response to an operation performed by the user A, the communication unit 31 of the communication terminal 30A may transmit a transmission stop request to the information processing system 50.

S33: The communication unit 51 of the information processing system 50 receives the transmission start request and requests the image capturing apparatus 10 identified by the image capturing apparatus ID to start transmission. The information processing system 50 may use a push notification or use polling, which is performed by the image capturing apparatus 10. In the image capturing apparatus 10, the connection unit 16 receives the transmission start request, and the imaging processing unit 13 starts capturing a wide-view image. The image transmission control unit 18 repeatedly transmits the wide-view image with a determined frame rate (expressed in FPS) or a frame rate (expressed in FPS) corresponding to a band via the connection unit 16. As a result, the communication terminal 30 that has entered the virtual room can display the state of the site A on the image viewing screen 210 in real time.

Distribution of Wide-View Image and Others

Figure 23:
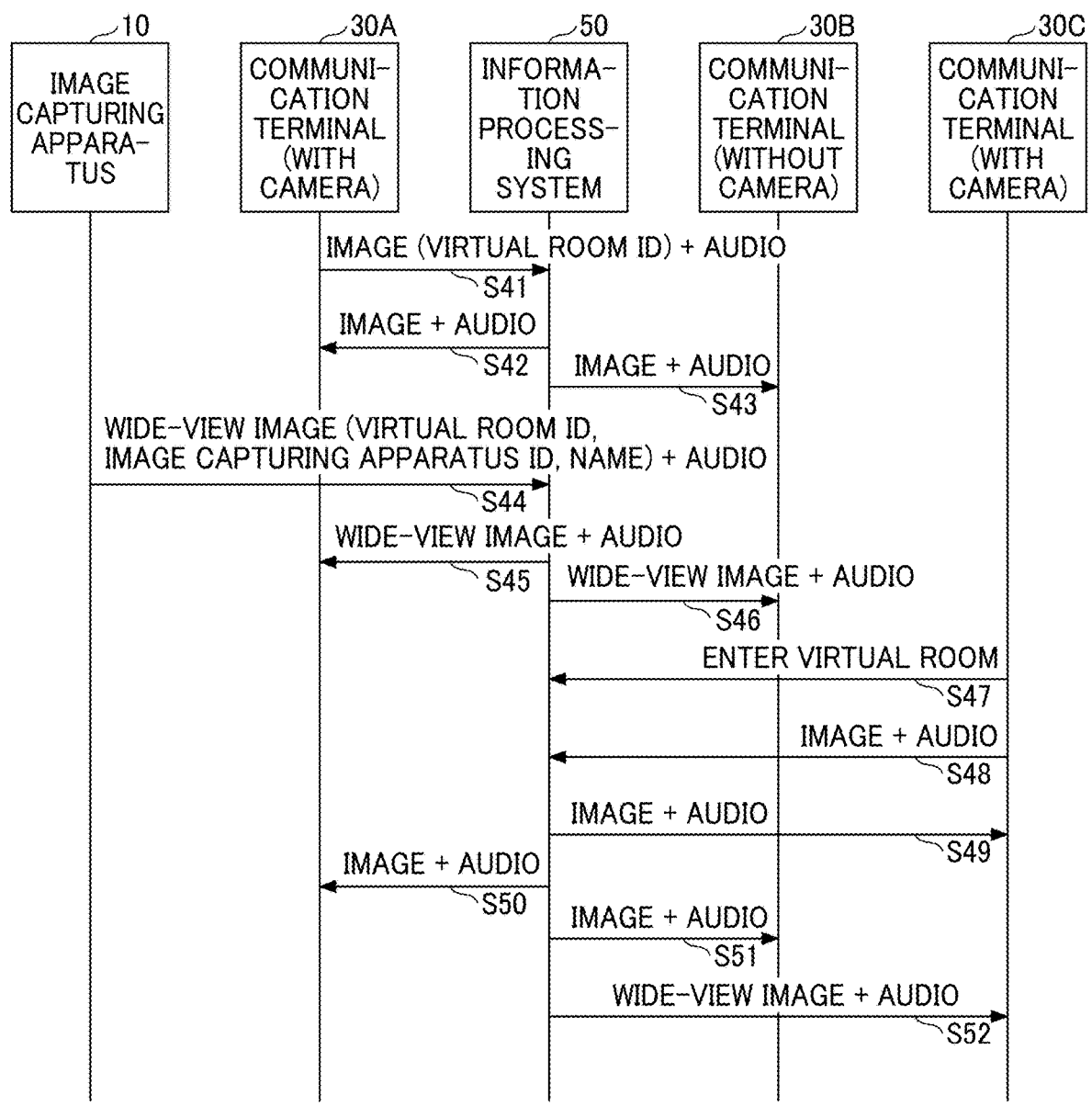
FIG. 23 is a sequence diagram illustrating an example process for sharing a wide-view image.

A process for sharing a wide-view image or an image having a normal angle of view will be described with reference to FIG. 23. FIG. 23 is a sequence diagram illustrating an example process for sharing a wide-view image. In FIG. 23, the communication terminals 30A and 30B have entered the virtual room. The communication terminal 30A includes the camera 9 having a normal angle of view, and an image captured by the camera 9 is shared with the communication terminal 30B. An image captured by the smart glasses 88 associated with the virtual room, instead of the camera 9 of the communication terminal 30A, may be shared.

S41: In the communication terminal 30A, the imaging unit 34 repeatedly captures an image to obtain captured images, and the communication unit 31 designates the virtual room ID of the virtual room that the communication unit 31 is in and repeatedly transmits the images and audio to the information processing system 50.

S42 and S43: In the information processing system 50, in response to the communication unit 51 receiving the images and the audio, the image distribution unit 54 acquires the IP addresses of the communication terminals 30A and 30B, which are in the virtual room, from the virtual room information storage unit 5002, and transmits the images and the audio via the communication unit 51. In FIG. 23, an image having a normal angle of view is received by the communication unit 31 of the communication terminal 30A from the information processing system 50 and is displayed. In another example, an image having a normal angle of view is not received from the information processing system 50, but an image having a normal angle of view is captured by the imaging unit 34 and is displayed.

S44: In the image capturing apparatus 10, in response to a transmission start request made by turning on the toggle button 291, the imaging processing unit 13 repeatedly captures a wide-view image to obtain captured wide-view images, and the image transmission control unit 18 designates the virtual room ID, the image capturing apparatus ID, the name, and the description and repeatedly transmits the wide-view images and audio to the information processing system 50 via the connection unit 16.

S45 and S46: In of the information processing system 50, in response to the communication unit 51 receiving the wide-view images and the audio, the image distribution unit 54 acquires the IP addresses of the communication terminals 30A and 30B, which are in the virtual room, from the virtual room information storage unit 5002, and transmits the wide-view images and the audio via the communication unit 51.

S47: The communication terminal 30C including the camera 9 newly enters the virtual room.

S48: The communication unit 31 of the communication terminal 30C transmits an image having a normal angle of view and audio to the information processing system 50.

S49 to S51: In of the information processing system 50, the communication unit 51 receives the image having a normal angle of view and the audio from the communication terminal 30C, and the image distribution unit 54 acquires the IP addresses of the communication terminals 30A to 30C, which are in the virtual room, from the virtual room information storage unit 5002, and transmits the image having a normal angle of view and the audio.

S52: The communication unit 51 of the information processing system 50 also transmits the wide-view images and the audio to the communication terminal 30C, which is in the same virtual room.

As described above, the users A and B, who are in the same virtual room, can share the wide-view images captured by the image capturing apparatus 10 associated with the virtual room. The order of transmission of the images illustrated in FIG. 23 is an example. In another example, the wide-view images may be shared first, or the images having a normal angle of view may be shared first.

A supplementary description will be given of the smart glasses 88 and the VR goggles 89. The smart glasses 88 have a camera having a normal angle of view and a display function. The camera of the smart glasses 88 captures an image having a normal angle of view; and the captured image having a normal angle of view is distributed in a manner similar to that for the cameras 8 and 9. The display function of the smart glasses 88 is implemented by a flat screen, like that of an ordinary display. Thus, part of a wide-view image is displayed from a point of view designated by the user. The VR goggles 89 have a display function. In one example, the VR goggles 89 may also include a camera having a normal angle of view. The display function of the VR goggles 89 projects a wide-view image with a point of view determined by the orientation of the head of the user wearing the VR goggles 89. Thus, part of the wide-view image is displayed from a point of view corresponding to the orientation of the head of the user. While viewing a wide-view image with the smart glasses 88 or the VR goggles 89, the user can transmit, to the information processing system 50, an image capturing request that designates point-of-view information of the wide-view image being viewed.

Position Information

In scenes such as building construction site scenes, images of structures and/or machinery and materials are periodically captured and recorded as images every day to check differences between the images. In such a scene, it is difficult for a user to detect a change in images captured by the image capturing apparatus 10 when the image capturing apparatus 10 is installed in the same location but the orientation of the optical axis (i.e., the position) of the image capturing apparatus 10 is changed. The user desires to secure the image capturing apparatus 10 in position as much as possible. However, the image capturing apparatus 10 may be difficult to secure in a specific position for security or safety reasons. The capability of the image capturing apparatus 10 to capture images of 360 degrees makes the user less likely to worry about the camera orientation, but is also less likely to motivate the user to install the image capturing apparatus 10 in the same direction every day.

Figure 24A:
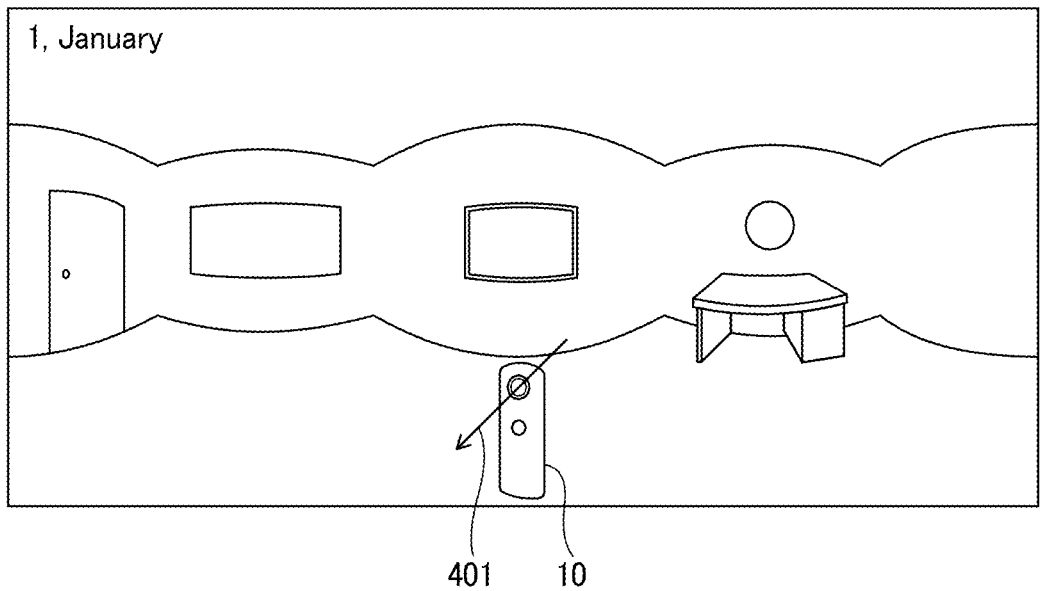
FIGS. 24A and 24B are views illustrating a difference between the positions of an image capturing apparatus installed on a first day and a second day according to the embodiment.
Figure 24B:
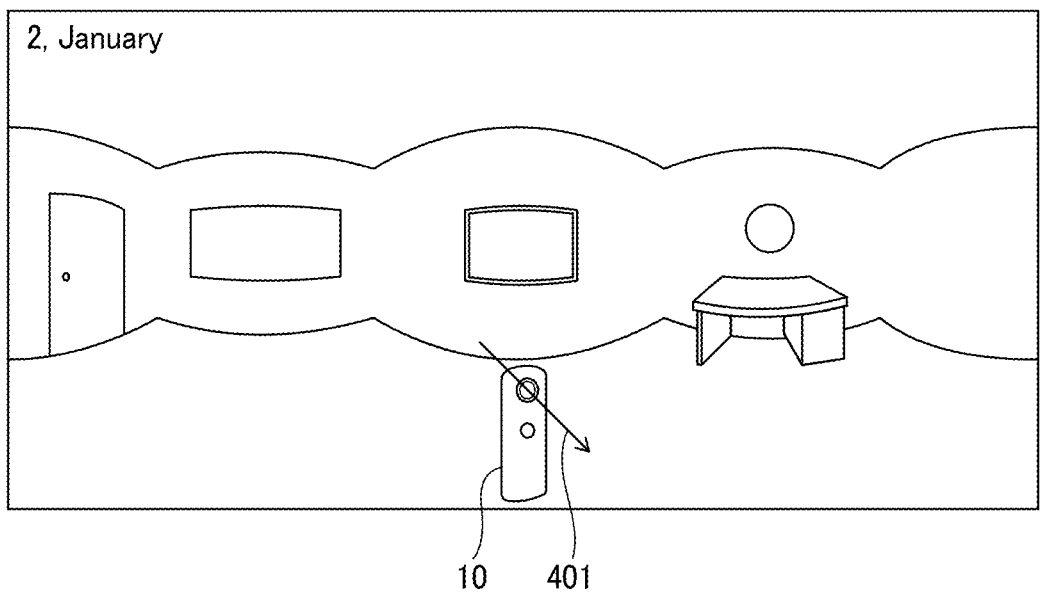

FIGS. 24A and 24B illustrate a difference between the positions of the image capturing apparatus 10 installed on a first day and a second day. FIG. 24A illustrates a wide-view image captured in an installation location on the first day. FIG. 24B illustrates a wide-view image captured in an installation location on the second day. The second day is a day on which the image capturing apparatus 10 is installed for recording, and the first day is the immediately preceding day or earlier. The second day is an example of a second time period, and the first day is an example of a first time period. In one example, the first time period is one week. In another example, the first time period is a day designated by the user. In one embodiment, the user designates any two days, and the communication terminal 30 displays a wide-view image that is corrected for the difference in position.

As illustrated in FIGS. 24A and 24B, the installation location on the first day and the installation location on the second day are substantially the same, but the image capturing apparatus 10 is installed in different positions (i.e., a difference occurs in roll angle described below). Thus, a difference occurs in optical-axis orientation 401 between the first day and the second day, resulting in different predetermined areas being viewed by the user in the initial state.

In this embodiment, the communication terminal 30 corrects the wide-view image captured on the second day to make the wide-view image have the same orientation as the wide-view image captured on the first day. Such a correction as described above allows the user to view a wide-view image captured in the same position as that on the first day even when the position of the image capturing apparatus 10 installed on the second day is changed from that on the first day.

Imaging Status Information

FIG. 25 illustrates imaging status information stored in the imaging status information storage unit 3002 of the communication terminal 30. The imaging status information includes point-of-view information, position information, and location information. As illustrated in FIG. 25, the imaging status information includes a storage date and time, point-of-view information, position information, and location information in association with an ID. In one example, the storage date and time associated with the ID "001" is 14:00 on Jan. 1, 2023, the storage date and time associated with the ID "002" is 14:10 on Jan. 1, 2023, and the storage date and time associated with the ID "003" is 14:00 on Jan. 2, 2023.

As indicated in the position information associated with the IDs "002" and "003", the position information is different between the first day and the second day. The first day and the second day are an example of time periods when the image capturing apparatus 10 is installed in different ways. The image correction processing according to this embodiment is applicable in a case where the position information is changed. Instead of the difference in time period, namely, the difference between the first day and the second day, for example, a difference in time, week, month, or year may be used.

The point-of-view information includes a pan angle (pan), a tilt angle (tilt), and a viewing angle (field of view (fov)).

The position information includes a roll angle (roll), a pitch angle (pitch), and a yaw angle (yaw). The location information includes latitude, longitude, and altitude values. The details will be described hereinafter.

FIGS. 26A to 26C illustrate the point-of-view information. FIG. 26A is a table that describes the pan angle (pan), the tilt angle (roll), and the viewing angle (fov). The point-of-view information indicates a predetermined range being displayed on a display by the user within a wide-view image.

The pan angle represents the horizontal angle (in radians). The pan angle has a value in the range of $-2\pi$ to $2\pi$.

The tilt angle represents the vertical angle (in radians). The tilt angle has a value in the range of $-\pi/2$ to $\pi/2$.

The viewing angle represents the vertical angle (in degrees) of the predetermined range. The center of the viewing angle is a point determined by the pan angle and the tilt angle.

FIG. 26B schematically illustrates the pan angle, the tilt angle, and the viewing angle in a three-dimensional space. As illustrated in FIG. 26B, the direction of the optical axis is determined by the pan angle and the tilt angle. As illustrated in FIG. 26C, the viewing angle is the angle of view in the height direction. The angle of view in the horizontal direction may be determined so as to achieve a predetermined aspect ratio. In one embodiment, the user views any predetermined area while changing the pan angle, the tilt angle, and the viewing angle as desired.

Figure 27:
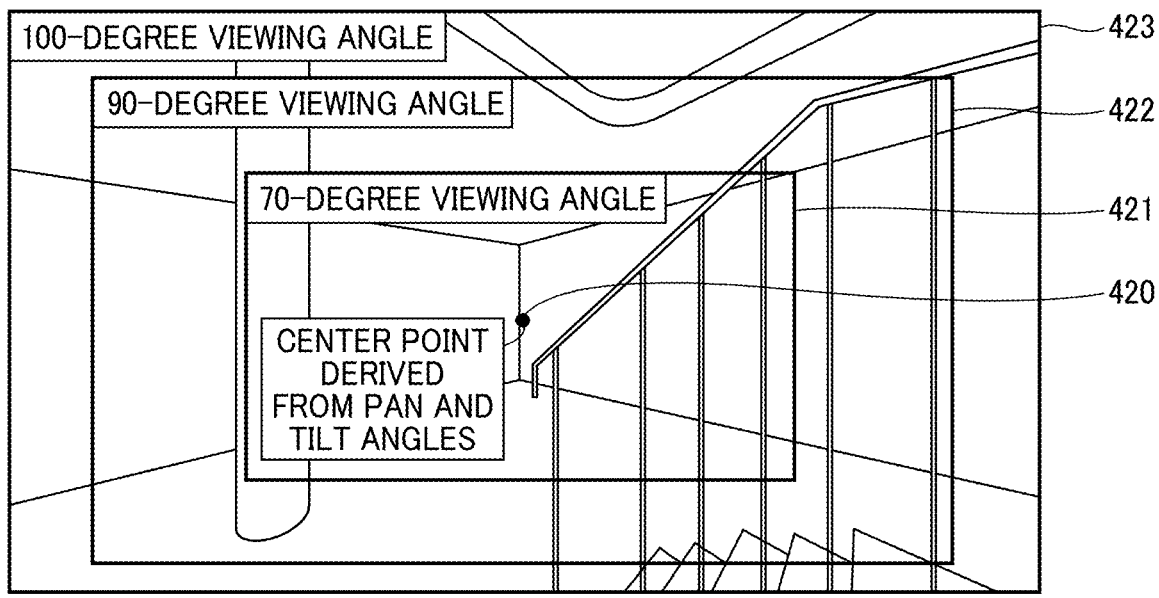
FIG. 27 is a view illustrating an example of different viewing angles and predetermined areas corresponding to the viewing angles.

FIG. 27 illustrates different viewing angles and predetermined areas corresponding to the viewing angles. In FIG. 27, a center point 420 is determined by the pan angle and the tilt angle. FIG. 27 illustrates predetermined areas 421, 422, and 423 for viewing angles of 70 degrees, 90 degrees, and 100 degrees, respectively. As the viewing angle increases, the portion of the wide-view image that the predetermined area, namely, the predetermined areas 421, 422, and 423, covers also increases.

The point-of-view information illustrated in FIG. 27 is stored in the manner as illustrated in FIG. 25. After the wide-view image is corrected in accordance with the difference in position, the communication terminal 30 uses the stored point-of-view information to display the same predetermined area as the previous one.

Figure 28:
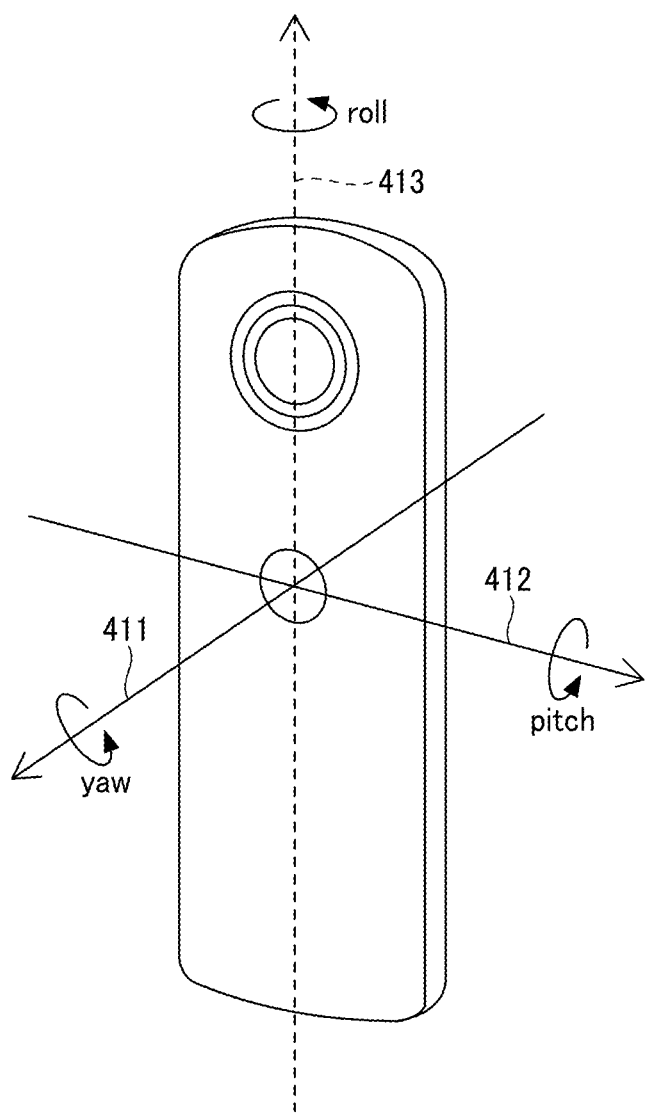
FIG. 28 is a view of the image capturing apparatus, illustrating a position of the image capturing apparatus according to the embodiment.

FIG. 28 illustrates a position of the image capturing apparatus 10. Three straight lines 411, 412, and 413 passing through the image capturing apparatus 10 are illustrated. The angle of rotation about the straight line 413, which extends in the vertical direction of the image capturing apparatus 10, is the roll angle, the angle of rotation about the straight line 412 is the pitch angle, and the angle of rotation about the straight line 411 is the yaw angle.

The roll angle, the pitch angle, and the yaw angle may each have a range of 360 degrees, with the roll, pitch, and yaw angles of the image capturing apparatus 10 in an upright position being 0 degrees. When the image capturing apparatus 10 is mounted on a tripod, the roll angle of the image capturing apparatus 10 is variable, with the pitch and yaw angles remaining unchanged, when the tripod is horizontal.

Conversion between Equirectangular Projection Image and Unit Sphere

When the position of the image capturing apparatus 10 changes, the optical axis also changes. The change in optical axis corresponds to the rotation of the optical axis, which connects the center of a sphere and the surface of the sphere, about the center of the sphere. To rotate a wide-view image, a spherical format image is more simply processed than an equirectangular projection image. Accordingly, the image correction unit 35 converts coordinates in the equirectangular projection image into three-dimensional coordinates in a spherical format. In the spherical format, a unit sphere (three-dimensional coordinates) with a radius of 1 may be used to facilitate the processing.

Figure 29:
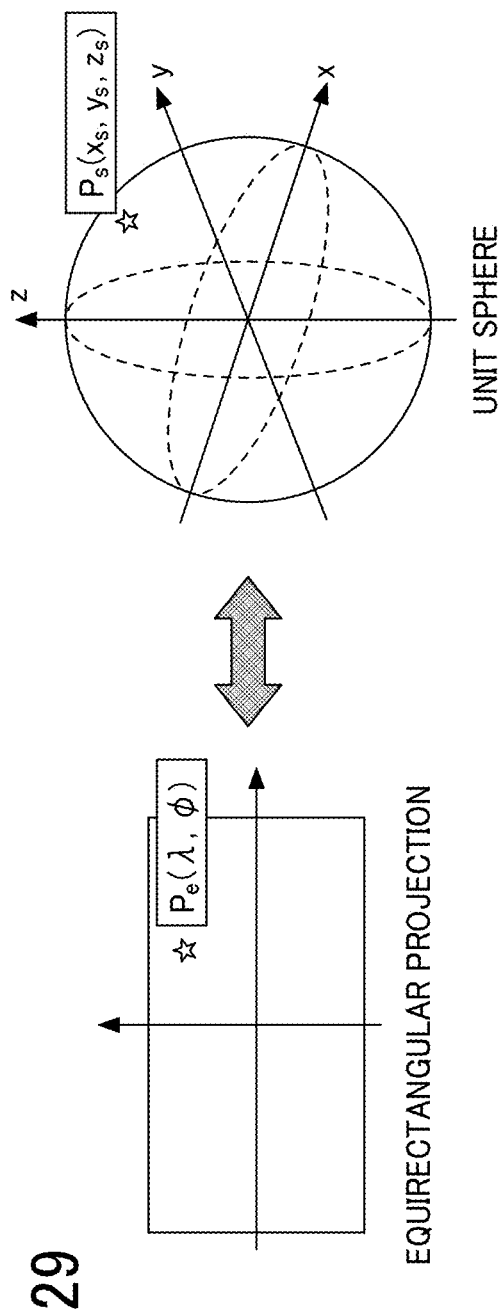
FIG. 29 is a view schematically illustrating conversion between two-dimensional coordinates in an image in equirectangular projection and three-dimensional coordinates on a surface of a unit sphere according to the embodiment.

FIG. 29 schematically illustrates conversion between two-dimensional coordinates in an equirectangular projection image and three-dimensional coordinates on the surface of a unit sphere. As illustrated in FIG. 29, the two-dimensional coordinates $P_e$ ($\lambda$, $\varphi$) of a point in the equirectangular projection image are converted into three-dimensional coordinates $P_s$ ($x_s$, $y_s$, $z_s$) of the corresponding point on the surface of the unit sphere. In some embodiments, three-dimensional coordinates $P_s$ ($x_s$, $y_s$, $z_s$) of a point on the surface of the unit sphere are converted into the two-dimensional coordinates $P_e$ ($\lambda$, $\varphi$) of the corresponding point in the equirectangular projection image.

Figure 30:
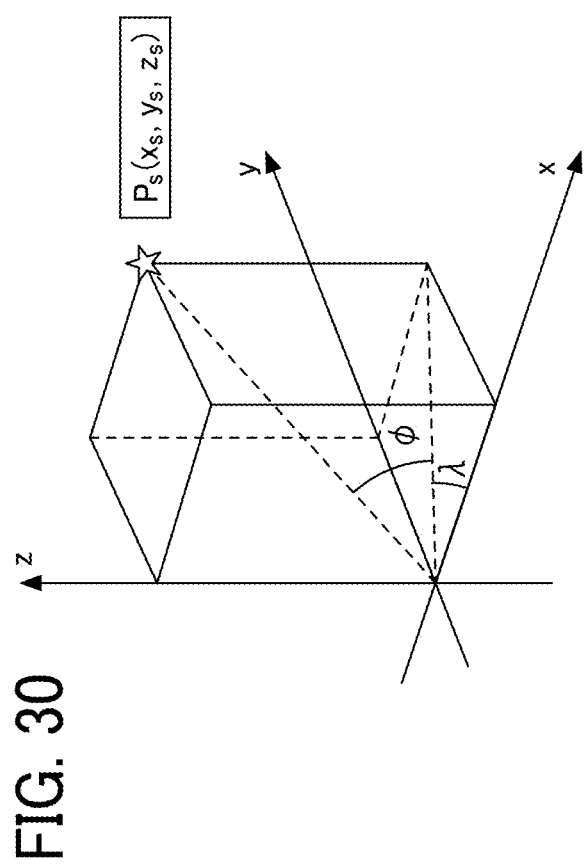
FIG. 30 is a view illustrating a correspondence between three-dimensional coordinates and polar coordinates according to an embodiment.

FIG. 30 illustrates a correspondence between three-dimensional coordinates and polar coordinates. The polar coordinates ($\lambda$, $\varphi$) indicating the three-dimensional coordinates $P_s$ ($x_s$, $y_s$, $z_s$) correspond to the two-dimensional coordinates in the equirectangular projection image. As a result, conversion formulas below are obtained from the correspondence illustrated in FIG. 30.

$$\begin{cases} x_s = \cos(\varphi)\cos(\lambda) \\ y_s = \cos(\varphi)\sin(\lambda) \\ z_s = \sin(\varphi) \end{cases} \quad (2)$$

Expression (2) provides conversion formulas for converting two-dimensional coordinates in the equirectangular projection image into three-dimensional coordinates on the surface of the unit sphere.

$$\begin{cases} \lambda = \tan^{-1}\left(\dfrac{y_s}{x_s}\right) \\ \varphi = \tan^{-1}\left(\dfrac{z_s}{\sqrt{x_s^2 + y_s^2}}\right) \end{cases} \quad (3)$$

Expression (3) provides conversion formulas for converting three-dimensional coordinates on the surface of the unit sphere into two-dimensional coordinates in the equirectangular projection image.

The communication terminal 30 converts the wide-view image captured on the second day, which is obtained as an equirectangular projection image, to a unit sphere and rotates the unit sphere in the opposite direction by an amount corresponding to the difference in position information between the first day and the second day. After that, the communication terminal 30 converts the wide-view image from the unit sphere back to the equirectangular projection image. Accordingly, even if the image capturing apparatus 10 is installed in different positions on the first day and the second day, the communication terminal 30 can display the wide-view image captured on the second day as a wide-view image captured in the same position as that on the first day. In addition, the communication terminal 30 can use the point-of-view information for the first day to display, in the wide-view image captured on the second day, the same predetermined area as the predetermined area of the wide-view image captured on the first day.

Figures 31A, 31B:
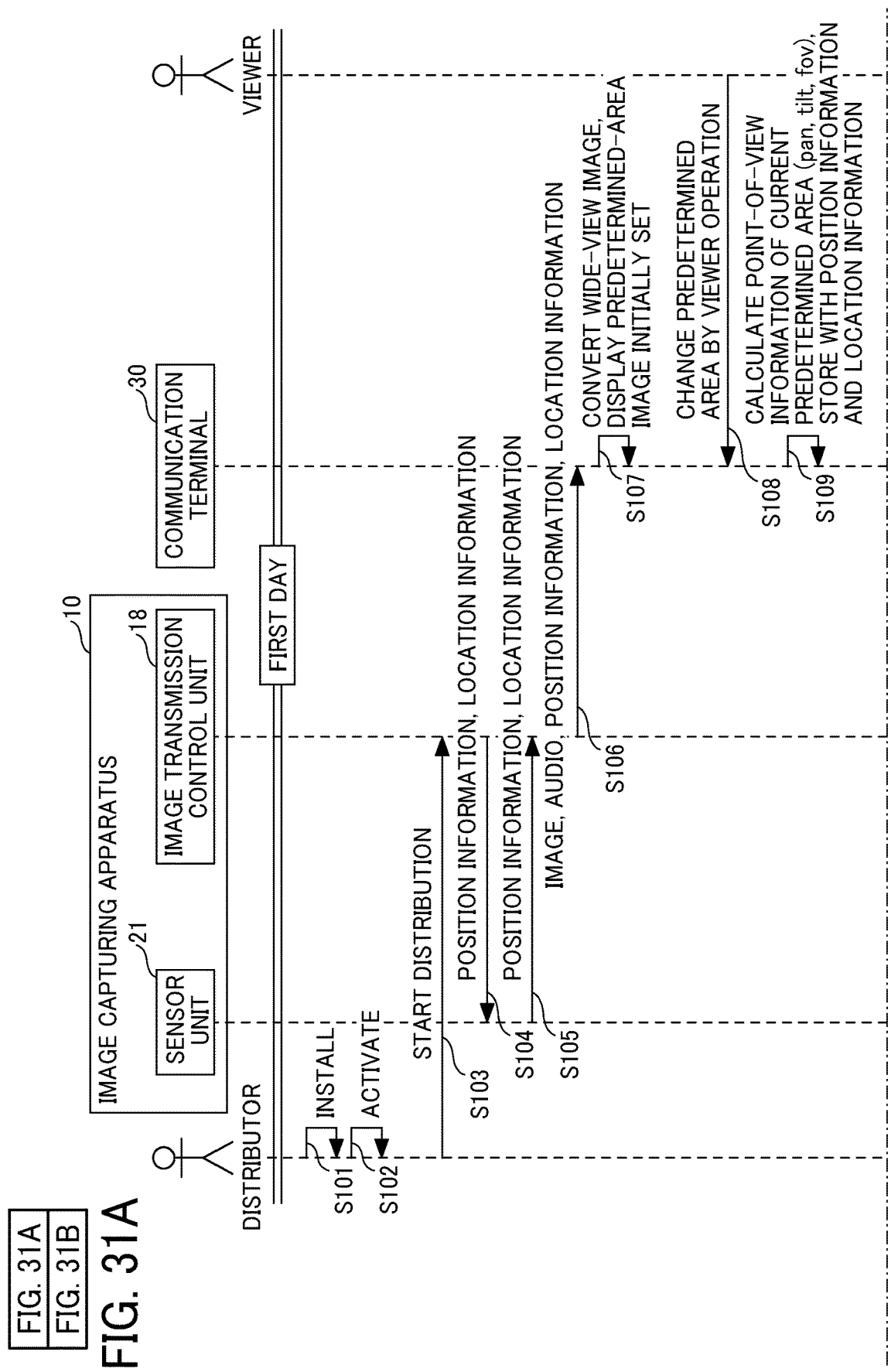
FIGS. 31A and 31B are sequence diagrams illustrating an example process performed when the image capturing apparatus is installed in different locations and positions on the first day and the second day, in which the communication terminal corrects, based on the difference in position between the first day and the second day, a wide-view image captured on the second day and displays the corrected wide-view image.
Figure 31B:
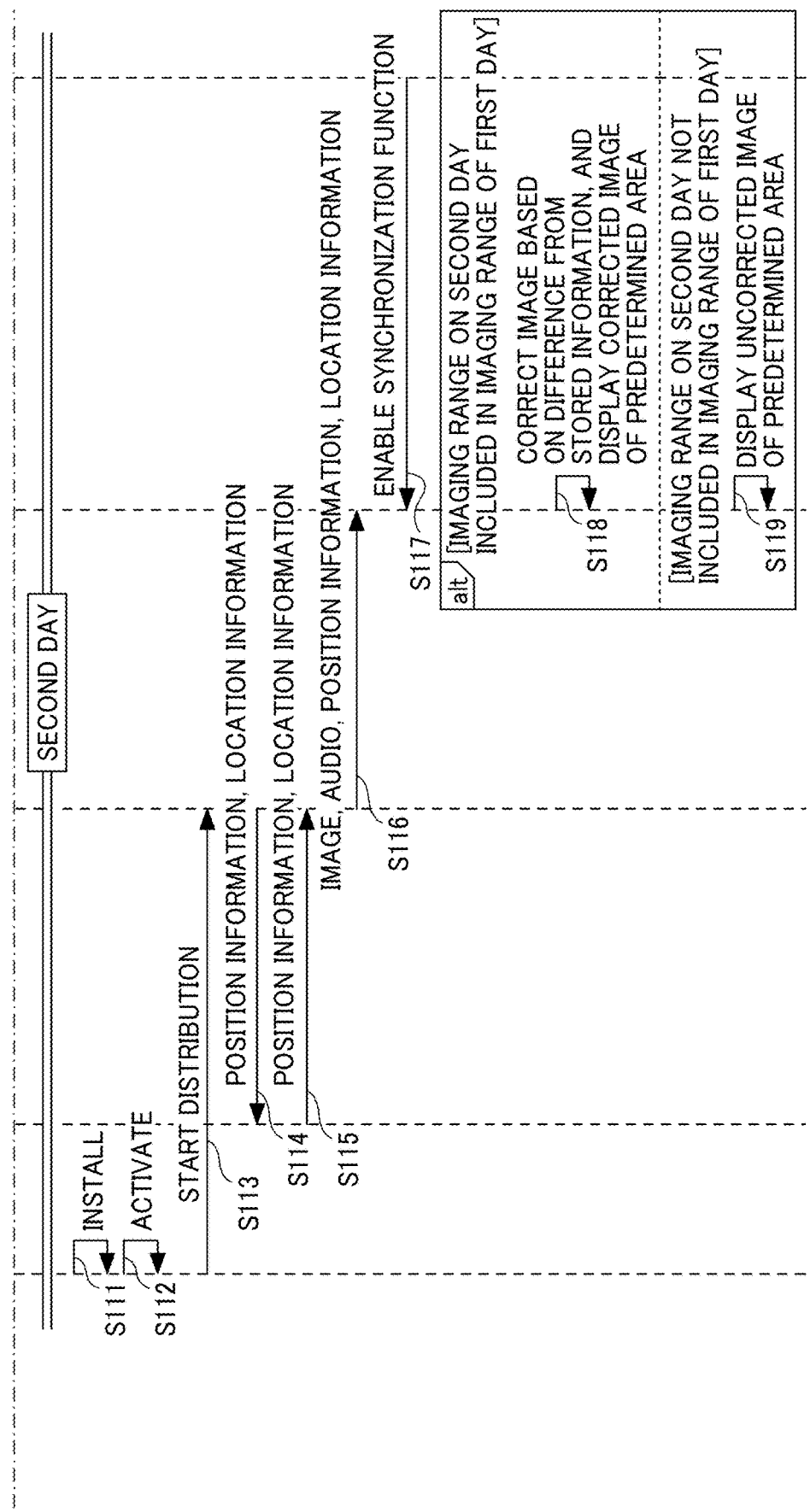

Process in Case of Different Installation Positions of Image Capturing Apparatus FIGS. 31A and 31B are sequence diagrams illustrating a process performed when the image capturing apparatus 10 is installed in different locations and positions on the first day and the second day. In the process, the communication terminal 30 corrects, based on the difference in position between the first day and the second day, a wide-view image captured on the second day and displays the corrected wide-view image. In FIGS. 31A and 31B, the illustration of the information processing system 50 and the relay server 70 is omitted. The image capturing apparatus 10 and the communication terminal 30 may communicate with each other via the information processing system 50 or the relay server 70.

S101, S102: First, a distributor installs the image capturing apparatus 10 in any location and position on the first day. After installing the image capturing apparatus 10, the distributor activates the image capturing apparatus 10.

S103: In response to a user operation or in response to activation, for example, by the distributor, the image transmission control unit 18 of the image capturing apparatus 10 determines to start distribution.

S104: The image transmission control unit 18 detects the start of the distribution and transmits a request for the position information and the location information to the sensor unit 21. Additionally, an odor or the like may also be detected.

S105: In response to the request, the sensor unit 21 transmits position information (an example of first position information) and location information to the image transmission control unit 18.

S106: The image transmission control unit 18 transmits a wide-view image captured by the imaging processing unit 13, the accompanying audio of the wide-view image, the position information, and the location information to the communication terminal 30. In one embodiment, the image transmission control unit 18 performs transmission via the information processing system 50 or the relay server 70.

S107: In response to receipt of the wide-view image, the audio, the position information, and the location information, the communication terminal 30 applies perspective projection conversion to the wide-view image and initially displays an initially set predetermined area.

S108: A viewer operates the communication terminal 30 to change the predetermined area of the wide-view image to view any predetermined-area image.

S109: Since the point-of-view information changes as the viewer changes the predetermined area, the storing/reading unit 39 calculates the current point-of-view information each time the viewer changes the predetermined area, and stores the current point-of-view information in the imaging status information storage unit 3002 together with the position information and the location information. In one example, the storing/reading unit 39 may store the point-of-view information, the position information, and the location information in the image capturing apparatus 10 or in the relay server 70 or the information processing system 50 via which the information described above is transmitted. In other words, the imaging status information storage unit 3002 may be included in the relay server 70 or the information processing system 50, or may reside on a network. In one example, the relay server 70 or the information processing system 50 includes the imaging status information storage unit 3002, and the acquisition unit 36 downloads the imaging status information stored in the imaging status information storage unit 3002 in response to the communication terminal 30 starting a conference.

In one example, each time the point-of-view information is changed, the storing/reading unit 39 may store the point-of-view information and the position information and the location information for the first day. In another example, in response to a change in the position information or the location information transmitted from the image capturing apparatus 10, the storing/reading unit 39 may store the point-of-view information, the position information, and the location information. The position information and the location information are stored in response to a change in the position information or the location information transmitted from the image capturing apparatus 10, whereby the position information and the location information can be stored when the installation location of the image capturing apparatus 10 changes.

Next, distribution on the second day will be described.

S111 to S116: On the second day, like the first day, the distributor again installs the image capturing apparatus 10, and then the image capturing apparatus 10 starts distributing a wide-view image.

S117: The viewer who desires to view the wide-view image from the same position as that on the first day performs an operation of enabling a synchronization function on the communication terminal 30. In response to enabling of the synchronization function, the acquisition unit 36 of the communication terminal 30 acquires the position information and the point-of-view information, which are stored in step S109, from the imaging status information storage unit 3002. The image correction unit 35 compares the acquired position information with the position information (an example of second position information) received in step S116. In one example, the acquisition unit 36 acquires the position information and the point-of-view information, which are stored most recently, from the imaging status information storage unit 3002. In another example, the viewer may designate the day for which to acquire the position information and the point-of-view information.

S118: If the imaging range on the second day is included in the imaging range on the first day, the communication terminal 30 corrects the wide-view image captured on the second day into a wide-view image viewed from the same position as that on the first day, and displays the corrected wide-view image with the point-of-view information for the first day. As a result, the viewer can view a predetermined-area image from the same point of view in the same position as those on the first day. The conversion of the wide-view image will be described in detail below.

In a case where the imaging range on the second day is included in the imaging range on the first day, the position of the image capturing apparatus 10 is not greatly changed between the second day and the first day. If the difference in position information between the first day and the second day is greater than or equal to a threshold, the image correction unit 35 determines that the imaging range on the second day is not included in the imaging range on the first day. The threshold is determined experimentally as appropriate. This example is based on the assumption that the installation location of the image capturing apparatus 10 is not changed between the first day and the second day or the image capturing apparatus 10 is installed in substantially the same location on the first day and the second day. Since the image capturing apparatus 10 is configured to capture an image of the entire 360-degree area, the installation of the image capturing apparatus 10 in greatly different positions may cause little inconvenience. Thus, the determination in step S118 may be omitted.

In FIGS. 31A and 31B, the process for correcting a wide-view image is performed by the communication terminal 30. In some examples, the process may be performed by the image capturing apparatus 10, the information processing system 50, or the relay server 70.

Figure 32:
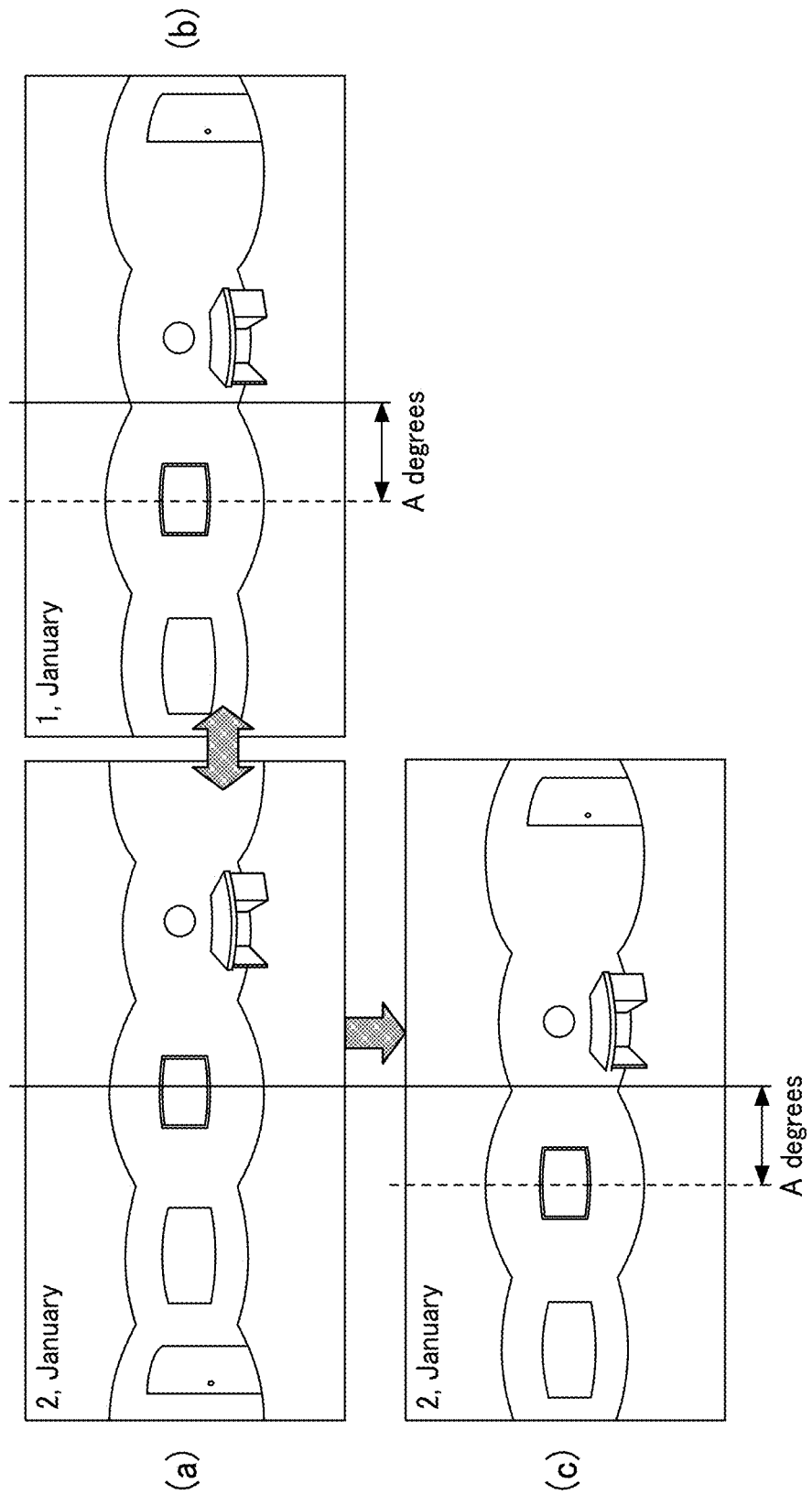
FIG. 32 is a view illustrating a process for correcting a wide-view image based on a difference in the position of the image capturing apparatus according to the embodiment.

S119: If the imaging range on the second day is not included in the imaging range on the first day, the communication terminal 30 displays the wide-view image without correction Correction of Wide-View Image with Different Position as Point of View FIG. 32 illustrates a process performed in step S118 to correct a wide-view image based on a difference in the position of the image capturing apparatus 10. In FIG. 32, for convenience of description, it is assumed that the roll angle is changed with the pitch and yaw angles remaining unchanged between the first day and the second day.

In FIG. 32, part (a) illustrates an equirectangular projection image captured on the second day. In FIG. 32, part (b) illustrates an equirectangular projection image captured on the first day. As illustrated in part (b) of FIG. 32, the roll angle is changed by A degrees between the first day and the second day. A change in the roll angle with the pitch and yaw angles remaining unchanged affects the horizontal angle of the equirectangular projection image.

Since a change in the roll angle is addressed by horizontal correction, the image correction unit 35 corrects the wide-view image captured on the second day in the horizontal direction (corresponding to the longitude of the equirectangular projection image) such that the optical axis of the wide-view image is oriented in the same direction as the optical axis of the wide-view image captured on the first day. In other words, the image correction unit 35 horizontally moves the wide-view image captured on the second day by an amount corresponding to the difference in roll angle between the first day and the second day. Whether the roll angle is positive or negative and whether to move the longitude of the equirectangular projection image to the positive direction or the negative direction (to the left or right) are set in advance.

In FIG. 32, part (c) illustrates the wide-view image captured on the second day after the wide-view image has been moved horizontally in accordance with the change in the roll angle. As a result of the comparison between the wide-view images illustrated in parts (c) and (a) of FIG. 32, the wide-view image captured on the second day is moved horizontally by an amount corresponding to A degrees, which is the same as the change in the roll angle. In one example, the position information for the first day and the position information for the second day are different not only in the roll angle but also in any other angle. In this case, the image correction unit 35 converts the wide-view image from the equirectangular projection image to a unit sphere before correcting the wide-view image based on the differences in position.

Figure 33A:
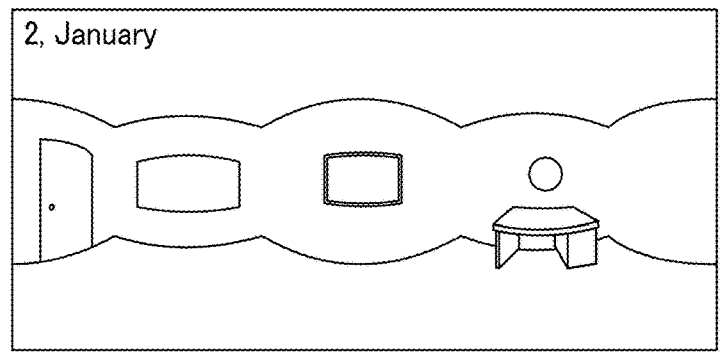
FIGS. 33A, 33B, and 33C are views illustrating a process for converting a wide-view image to a unit sphere and correcting the wide-view image based on a difference in position information between the first day and the second day according to the embodiment.
Figure 33B:
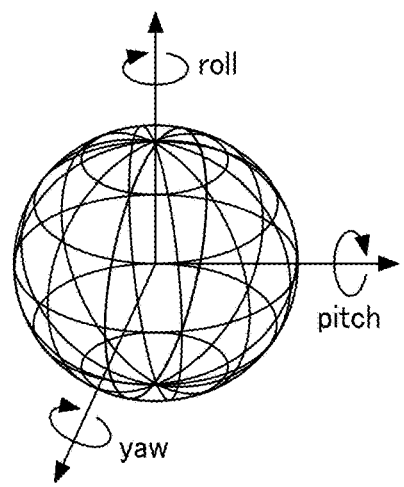
Figure 33C:
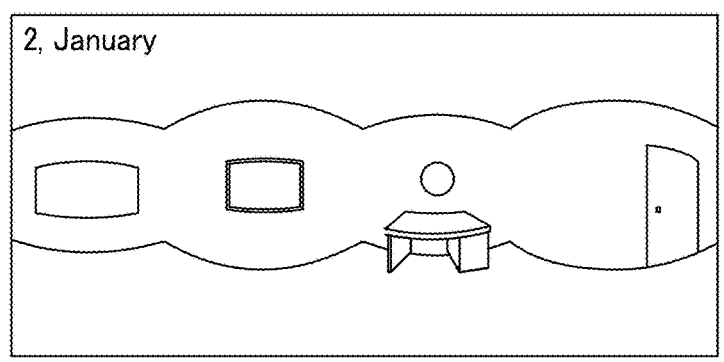

FIGS. 33A to 33C illustrate a process for converting a wide-view image to a unit sphere and correcting the wide-view image based on a difference in position information between the first day and the second day. FIG. 33A illustrates an equirectangular projection image captured on the second day.

The image correction unit 35 corrects the wide-view image based on the difference in position information between the first day and the second day by, as illustrated in FIG. 33B, converting the wide-view image from the equirectangular projection image to the unit sphere by using Expression (2). Then, the image correction unit 35 rotates the unit sphere in the opposite direction to the difference in position information between the first day and the second day. The rotation of the unit sphere may be a combination of rotations about the respective axes.

After rotating the unit sphere, the image correction unit 35 converts the wide-view image from the unit sphere to an equirectangular projection image by using Expression (3) (FIG. 33C).

As described above, the communication system 1 according to this embodiment converts an equirectangular projection image to a unit sphere and rotates the unit sphere by an amount corresponding to the difference in position information. With this operation, a wide-view image captured by the image capturing apparatus 10 on the second day can be displayed from a point of view viewed from the position in which the image capturing apparatus 10 captures a wide-view image on the first day.

As described above, the communication system 1 according to this embodiment allows display of the same predetermined area even when the image capturing apparatus 10 captures images in slightly different positions during different conferences held in different time periods.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

In the example configurations such as that illustrated in FIG. 13, the information processing system 50, the image capturing apparatus 10, and the communication terminal 30 are divided according to main functions thereof to facilitate understanding of the processes performed by the information processing system 50, the image capturing apparatus 10, and the communication terminal 30. No limitation is intended by how processing is divided into units or by the name of the units. The processing of each of the information processing system 50, the image capturing apparatus 10, and the communication terminal 30 may be divided into more units of processing in accordance with the content of the processing. Further, the division may be made such that each unit of processing includes more processing operations.

The functionality of the elements disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), conventional circuitry and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of a FPGA or ASIC.

The apparatuses or devices described in one or more embodiments are merely representative of one of multiple computing environments that implement the one or more embodiments disclosed herein. In some examples, the information processing system 50 includes multiple computing devices such as a server cluster. The multiple computing devices are configured to communicate with one another through any type of communication link including, for example, a network or a shared memory, and perform the processes disclosed herein.

Further, the information processing system 50 may be configured to share the processing steps disclosed herein, for example, the processing steps illustrated in FIGS. 31A and 31B, in various combinations. For example, a process executed by a predetermined unit may be executed by a plurality of information processing apparatuses included in the information processing system 50. The components of the information processing system 50 may be integrated into one server apparatus or divided into a plurality of apparatuses.

In Aspect 1, a communication terminal for receiving, via a network, a wide-view image captured by an image capturing apparatus includes a storing/reading unit, a communication unit, an image correction unit, and a display control unit. The storing/reading unit stores first position information of the image capturing apparatus. The first position information is information indicating a position of the image capturing apparatus in a first time period in which the image capturing apparatus is installed. The communication unit receives second position information of the image capturing apparatus and a wide-view image. The second position information is information indicating a position of the image capturing apparatus in a second time period in which the image capturing apparatus is installed. The wide-view image is captured by the image capturing apparatus in the second time period. The image correction unit corrects the wide-view image, based on a difference between the received second position information and the stored first position information. The display control unit displays the wide-view image corrected by the image correction unit.

According to Aspect 2, in the communication terminal of Aspect 1, the image correction unit corrects the wide-view image, based on the difference between the first position information and the second position information, to obtain a wide-view image captured with the first position information.

According to Aspect 3, in the communication terminal of Aspect 1 or Aspect 2, the storing/reading unit stores the first position information in association with point-of-view information indicating a point of view of a wide-view image in the first time period, and the display control unit displays the wide-view image corrected by the image correction unit, using the point-of-view information as a point of view of the corrected wide-view image.

According to Aspect 4, in the communication terminal of Aspect 2, the difference between the first position information and the second position information is caused by a rotation of the image capturing apparatus about a vertical axis of the image capturing apparatus, the wide-view image is obtained as an equirectangular projection image, and the image correction unit horizontally moves the wide-view image as the equirectangular projection image by an amount corresponding to an angle by which the rotation occurs.

According to Aspect 5, in the communication terminal of Aspect 2, the wide-view image is obtained as an equirectangular projection image, and the image correction unit converts the wide-view image from the equirectangular projection image to a unit sphere, rotates the unit sphere in accordance with the difference between the first position information and the second position information, and converts the wide-view image from the rotated unit sphere back to the equirectangular projection image to correct the wide-view image into the wide-view image captured with the first position information.

According to Aspect 6, in the communication terminal of Aspect 3, in response to a change in the first position information transmitted from the image capturing apparatus, the storing/reading unit stores the first position information and the point-of-view information.

According to Aspect 7, in the communication terminal of any one of Aspects 1 to 6, the first time period and the second time period include two consecutive days, the second time period including one day of the two consecutive days, the first time period including a preceding day of the one day.

According to Aspect 8, a display method includes: storing first position information of an image capturing apparatus in a memory, the first position information indicating a position of the image capturing apparatus when installed in a first time period; receiving a wide-view image captured by the image capturing apparatus in a second time period and second position information of the image capturing apparatus via a network, the second position information indicating a position of the image capturing apparatus when installed in the second time period; correcting the wide-view image captured in the second time period, based on a difference between the first position information and the second position information; and displaying the corrected wide-view image on a display.

The invention claimed is:

1. A communication terminal, comprising:
circuitry configured to:
store first position information of an image capturing apparatus in a memory, the first position information indicating a first position of the image capturing apparatus when installed in a first time period;
receive a wide-view image captured by the image capturing apparatus in a second time period and second position information of the image capturing apparatus via a network, the second position information indicating a second position of the image capturing apparatus when installed in the second time period;
determine, based on a difference between the first position information and the second position information, whether an imaging range of the wide-view image captured in the second time period is included in an imaging range of a wide-view image captured at the first position in the first time period; and
in a case that the circuitry determines that the imaging range of the wide-view image captured in the second time period is included in the imaging range of the wide-view image captured in the first time period:
correct the wide-view image captured in the second time period based on the difference between the first position and the second position; and
display the corrected wide-view image on a display.

2. The communication terminal according to claim 1, wherein the circuitry is configured to correct the wide-view image captured in the second time period into a wide-view image captured with the first position information, based on the difference between the first position information and the second position information.

3. The communication terminal according to claim 1, wherein
the circuitry is configured to store the first position information in the memory in association with point-of-view information indicating a point of view of the wide-view image captured in the first time period, and
the corrected wide-view image has a point of view based on the point-of-view information of the wide-view image captured in the first time period.

4. The communication terminal according to claim 2, wherein
the difference between the first position information and the second position information is based on a rotation of the image capturing apparatus about a vertical axis of the image capturing apparatus, and
the circuitry is configured to horizontally move the wide-view image captured in the second time period by an amount corresponding to an angle by which the rotation occurs, the wide-view image being an equirectangular projection image.

5. The communication terminal according to claim 2, wherein the circuitry is configured to:
convert the wide-view image captured in the second time period from an equirectangular projection image to a unit sphere;
rotate the unit sphere based on the difference between the first position information and the second position information to obtain a rotated unit sphere; and
convert the rotated unit sphere back to the equirectangular projection image to correct the wide-view image captured in the second time period into the wide-view image captured with the first position information.

6. The communication terminal according to claim 3, wherein the circuitry is configured to store the first position information and the point-of-view information in the memory in a case that the first position information transmitted from the image capturing apparatus changes.

7. The communication terminal according to claim 1, wherein the first time period and the second time period include two consecutive days, the second time period including one day of the two consecutive days, the first time period including a preceding day of the one day.

8. The communication terminal according to claim 1, wherein
the first position information is first orientation information indicating an orientation of the image capturing apparatus when installed in the first time period, and
the second position information is second orientation information indicating an orientation of the image capturing apparatus when installed in the second time period.

9. The communication terminal according to claim 8, wherein the first orientation information includes at least one of a roll angle, a pitch angle, or a yaw angle of the image capturing apparatus.

10. The communication terminal according to claim 1, wherein the second time period does not overlap the first time period.

11. The communication terminal according to claim 1, wherein in a case that the circuitry determines that the imaging range of the wide-view image captured in the second time period is not included in the imaging range of the wide-view image captured in the first time period, the circuitry is further configured to display the wide-view image on the display.

12. A communication system, comprising:
an image capturing apparatus;
a memory that stores first position information of the image capturing apparatus, the first position information indicating a first position of the image capturing apparatus when installed in a first time period; and
circuitry configured to:
receive a wide-view image captured by the image capturing apparatus in a second time period and second position information of the image capturing apparatus via a network, the second position information indicating a second position of the image capturing apparatus when installed in the second time period;
determine, based on a difference between the first position information and the second position information, whether an imaging range of the wide-view image captured in the second time period is included in an imaging range of a wide-view image captured at the first position in the first time period; and
in a case that the circuitry determines that the imaging range of the wide-view image captured in the second time period is included in the imaging range of the wide-view image captured in the first time period:
correct the wide-view image captured in the second time period based on the difference between the first position and the second position; and display the corrected wide-view image on a display.

13. A display method, comprising:

storing first position information of an image capturing apparatus in a memory, the first position information indicating a first position of the image capturing apparatus when installed in a first time period;

receiving a wide-view image captured by the image capturing apparatus in a second time period and second position information of the image capturing apparatus via a network, the second position information indicating a second position of the image capturing apparatus when installed in the second time period;

determining, based on a difference between the first position information and the second position information, whether an imaging range of the wide-view image captured in the second time period is included in an imaging range of a wide-view image captured at the first position in the first time period; and in a case that the determining indicates that the imaging range of the wide-view image captured in the second time period is included in the imaging range of the wide-view image captured in the first time period:

correcting the wide-view image captured in the second time period based on the difference between the first position and the second position; and displaying the corrected wide-view image on a display.

14. A non-transitory recording medium storing a plurality of instructions which, when executed by one or more processors, causes the processors to perform a display method comprising:

storing first position information of an image capturing apparatus in a memory, the first position information indicating a first position of the image capturing apparatus when installed in a first time period;

receiving a wide-view image captured by the image capturing apparatus in a second time period and second position information of the image capturing apparatus via a network, the second position information indicating a second position of the image capturing apparatus when installed in the second time period;

determining, based on a difference between the first position information and the second position information, whether an imaging range of the wide-view image captured in the second time period is included in an imaging range of a wide-view image captured at the first position in the first time period; and in a case that the determining indicates that the imaging range of the wide-view image captured in the second time period is included in the imaging range of the wide-view image captured in the first time period:

correcting the wide-view image captured in the second time period based on the difference between the first position and the second position; and displaying the corrected wide-view image on a display.

\* \* \* \* \*